(12) United States Patent
Li et al.

(10) Patent No.: US 12,266,177 B2
(45) Date of Patent: Apr. 1, 2025

(54) MAP BUILDING METHOD, APPARATUS, AND SYSTEM, AND STORAGE MEDIUM

(71) Applicant: Shenzhen Yinwang Intelligent Technologies Co., Ltd., Shenzhen (CN)

(72) Inventors: Jia Li, Shanghai (CN); Qi Chen, Shanghai (CN); Xueming Peng, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 715 days.

(21) Appl. No.: 17/333,811

(22) Filed: May 28, 2021

(65) Prior Publication Data

US 2021/0287350 A1      Sep. 16, 2021

Related U.S. Application Data

(63) Continuation of application No. PCT/CN2019/117160, filed on Nov. 11, 2019.

(30) Foreign Application Priority Data

Nov. 30, 2018   (CN) .......................... 201811458309.X

(51) Int. Cl.
*G06K 9/00*    (2022.01)
*G06T 5/50*    (2006.01)
(Continued)

(52) U.S. Cl.
CPC ................ *G06V 20/46* (2022.01); *G06T 5/50* (2013.01); *G06T 7/73* (2017.01); *G06V 10/462* (2022.01);
(Continued)

(58) Field of Classification Search
CPC .. G06T 5/50; G06T 7/73; G06T 7/246; G06D 1/2462; G05D 1/2462; G05D 1/246; G05D 1/24
See application file for complete search history.

(56) References Cited

U.S. PATENT DOCUMENTS

2013/0216098 A1    8/2013   Hasegawa et al.
2014/0292573 A1    10/2014  Drescher et al.
(Continued)

FOREIGN PATENT DOCUMENTS

CN    103123727 A    5/2013
CN    103559498 A    2/2014
(Continued)

OTHER PUBLICATIONS

Zhao Kuang-jun et al., "3D color point cloud mapping for indoor environment with RGB-D camera", Journal of Harbin University of Commerce (Natural Sciences Edition), vol. 34 No. 1, with a partial machine translation, total 17 pages.

(Continued)

*Primary Examiner* — Molly Wilburn
*Assistant Examiner* — Aidan Keup
(74) *Attorney, Agent, or Firm* — Leydig, Voit & Mayer, Ltd.

(57) ABSTRACT

A map building apparatus includes a memory storing instructions, and a processor executing the instructions to obtain a plurality of frames of images that carry image information of a target environment, obtain a motion parameter of the image capture component at a capture location of each frame of the plurality of frames of images, obtain a relative displacement between capture locations of each two frames of images based on the motion parameter of the image capture component, obtain, based on the plurality of frames of images and the relative displacement, a map layer (Continued)

including feature points in the plurality of frames of images, and send the map layer and the relative displacement to a server. The plurality of frames of images are captured by an image capture component. The motion parameter indicates a motion status of the image capture component. The map layer is useable to build a map.

19 Claims, 12 Drawing Sheets

(51) Int. Cl.
    *G06T 7/73*         (2017.01)
    *G06V 10/46*       (2022.01)
    *G06V 10/75*       (2022.01)
    *G06V 10/80*       (2022.01)
    *G06V 20/40*       (2022.01)
    *G06V 20/56*       (2022.01)

(52) U.S. Cl.
    CPC .......... *G06V 10/751* (2022.01); *G06V 10/806* (2022.01); *G06V 20/56* (2022.01); *G06T 2207/20221* (2013.01)

(56) References Cited

U.S. PATENT DOCUMENTS

| | | | |
|---|---|---|---|
| 2018/0061024 A1 | 3/2018 | Koizumi | |
| 2018/0188043 A1* | 7/2018 | Chen | G06T 7/11 |
| 2018/0315201 A1 | 11/2018 | Cameron et al. | |
| 2019/0257659 A1* | 8/2019 | Moteki | G01C 21/3848 |

FOREIGN PATENT DOCUMENTS

| | | |
|---|---|---|
| CN | 103900583 A | 7/2014 |
| CN | 105631811 A | 6/2016 |
| CN | 107025668 A | 8/2017 |
| CN | 107741233 A | 2/2018 |
| CN | 108648235 A | 10/2018 |
| CN | 108665540 A | 10/2018 |
| JP | 5883673 B2 * | 3/2016 |
| JP | 2018124787 A | 8/2018 |
| JP | 2018173882 A | 11/2018 |
| WO | 2017022033 A1 | 2/2017 |
| WO | 2018136996 A1 | 8/2018 |
| WO | 2018142900 A1 | 8/2018 |

OTHER PUBLICATIONS

Duhao, "Research on The Key Technology of DEM Extraction Based on DSM Point Clouds", Lanzhou Jiaotong University, Jun. 17, 2016, with an English abstract, total 58 pages.

International Search Report issued in corresponding International Application No. PCT/CN2019/117160, dated Jan. 23, 2020, pp. 1-11.

Shin Minhwan et al: "3D LiDAR-based point cloud map registration: Using spatial location of visual features", 2017 2nd International Conference on Robotics and Automation Engineering (ICRAE), IEEE, Dec. 29, 2017, XP033320842, 6 pages.

Van Opdenbosch Dominik et al: "Collaborative Visual SLAM Using Compressed Feature Exchange",IEEE Robotics and Automation Letters, IEEE, Jan. 1, 2019, XP011705012, 8 pages.

Liangliang Pan et al., "UFSM_ VO: Stereo Odometry Based on Uniformly Feature Selection and Strictly Correspondence Matching", 2018 IEEE, total 5 pages.

Georges Younes et al., "Keyframe-based monocular SLAM: design, survey, and future directions", arxiv.org, Cornell University Library, 201 Olin Library Cornell University Ithaca, NY 14853, Jan. 7, 2018, total 25 pages.

European Search Report issued in corresponding European Application No. 19891455.8, dated Dec. 6, 2021, pp. 1-13, European Patent Office, Munich, Germany.

Korean Office Action issued in corresponding Korean Application No. 10-2021-7019684, dated Jul. 4, 2022, pp. 1-11.

Korean Notice of Allowance issued in corresponding Korean Application No. 10-2021-7019684, dated Nov. 1, 2022, pp. 1-2.

Chinese Notice of Allowance issued in corresponding Chinese Application No. 201811458309.X, dated Oct. 9, 2022, pp. 1-4.

\* cited by examiner

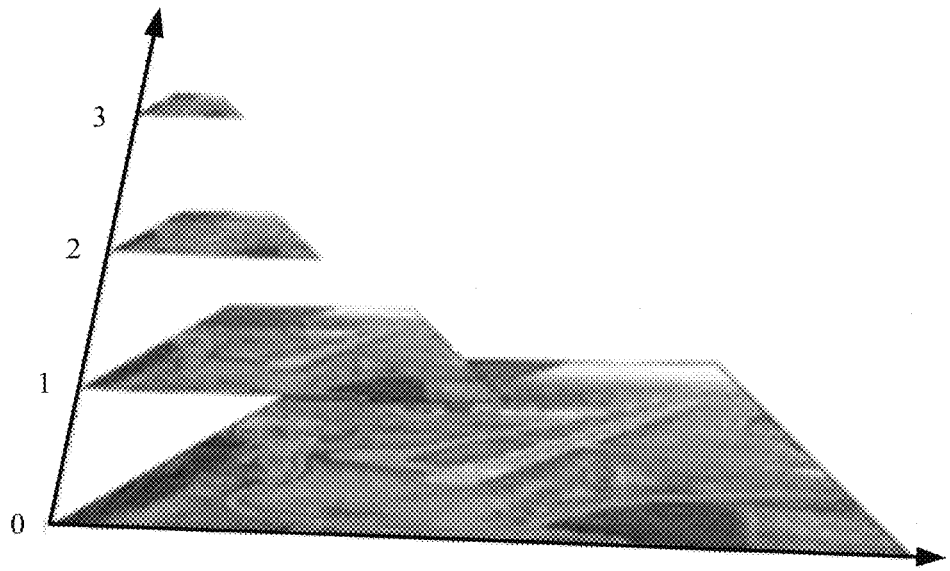

FIG. 7

Obtain, based on a pixel value of any first to-be-matched feature point in a first image and a pixel value of any second to-be-matched feature point in a second image, a specified parameter corresponding to the second to-be-matched feature point — 2031b When the specified parameter is less than a first preset threshold, determine that the first to-be-matched feature point matches the second to-be-matched feature point, to obtain a feature point pair including the first to-be-matched feature point and the second to-be-matched feature point — 2032b

FIG. 8

Obtain, based on both a pixel value of any first to-be-matched feature point at a first map layer and a pixel value of each second to-be-matched feature point at a second map layer, a specified parameter corresponding to the second to-be-matched feature point — 2051a Determine, as a feature point that matches the first to-be-matched feature point, a second to-be-matched feature point corresponding to a smallest specified parameter — 2052a

FIG. 9

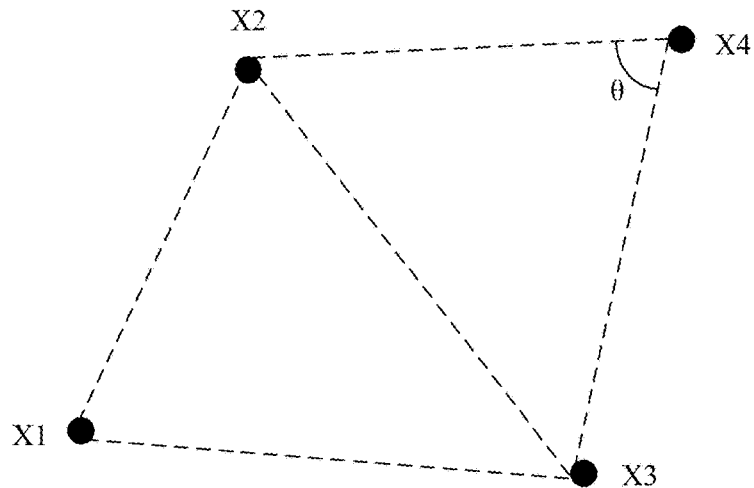

FIG. 14

| Determine, in all feature points at a second map layer, a second target point set based on each first projection plane, where each second target point set includes a plurality of feature points that match a plurality of feature points on the first projection plane in a one-to-one manner | 2062a2 |

↓

| Determine, as a second projection plane corresponding to the corresponding first projection plane, a plane on which the plurality of feature points included in each second target point set are located, to obtain at least one second projection plane | 2062b2 |

FIG. 15

MAP BUILDING METHOD, APPARATUS, AND SYSTEM, AND STORAGE MEDIUM

CROSS-REFERENCE TO RELATED APPLICATIONS

This application is a continuation of International Application No. PCT/CN2019/117160, filed on Nov. 11, 2019, which claims priority to Chinese Patent Application No. 201811458309.X, filed on Nov. 30, 2018. The disclosures of the aforementioned applications are hereby incorporated by reference in their entireties.

TECHNICAL FIELD

Embodiments of this application relate to the field of data processing technologies, and in particular, to a map building method, apparatus, and system, and a storage medium.

BACKGROUND

With continuous development of intelligent driving technologies, intelligent driving vehicles are increasingly widely applied. A parking lot environment is a quite important application environment of an intelligent driving vehicle. A high-accuracy parking lot localization map layer (LML) can ensure safe driving of an intelligent driving vehicle. The parking lot localization map layer includes information about feature points (for example, a geometric feature such as a width of a driving route, a length of the driving route, or a height of a curb, and a landmark feature such as a skyscraper or Leifeng Pagoda) in a parking lot. The parking lot localization map layer may be used to describe a current environment of the parking lot by using the feature points, and provide prior information (for example, location information and posture information of the intelligent vehicle in the parking lot environment) for determining a location of the vehicle in the parking lot, to perform automatic parking, automatic search for a parking place, smart summon of a vehicle, and the like based on the location.

Currently, during obtaining of a localization map layer of a parking lot, a plurality of frames of images carrying image information of an environment of the parking lot may be obtained by using an image capture component, and feature points in the parking lot environment may be determined based on the plurality of frames of images; a displacement relationship between different feature points may be determined based on absolute coordinates of each feature point in a world coordinate system that are provided by a global positioning system (GPS); and then the parking lot localization map layer including a plurality of feature points may be established based on the displacement relationship.

A process of obtaining the parking lot localization map layer needs to rely on location information provided by the GPS, but a GPS signal in the parking lot environment may be affected. Consequently, reliability of location information determined based on the GPS signal is relatively low. For example, incorrect location information may be received and/or no location information may be received. As a result, accuracy of the parking lot localization map layer obtained in this manner is relatively low.

SUMMARY

Embodiments of this application provide a map building method, apparatus, and system, and a storage medium, to resolve a problem in a related technology as follows: Reliability of location information determined based on a GPS signal is relatively low because the GPS signal may be affected, and consequently accuracy of an obtained parking lot localization map layer is relatively low. Technical solutions include the following.

According to a first aspect of this application, a map building method is provided. The method includes: performing feature point matching on feature points at every two map layers of a plurality of map layers used to build a map, to obtain a plurality of feature point pairs, wherein each feature point pair includes two feature points that are respectively from the two map layers and that match each other, each map layer includes feature points in a plurality of frames of images, and each frame of image carries image information of a target environment; obtaining a target displacement relationship between the two map layers based on map layer space coordinates, at a corresponding map layer, of each feature point in each feature point pair, wherein the map layer space coordinates are obtained based on image coordinates of the feature point in a target image and a relative displacement between capture locations of every two frames of target images, the relative displacement is obtained based on a motion parameter of an image capture component at the image capture locations, the motion parameter is used to indicate a motion status of the image capture component, and the target image is an image in which the feature point is located; and performing map layer fusion on the every two map layers based on the target displacement relationship between the every two map layers, to obtain a map of the target environment.

Feature point matching is performed on the feature points at the every two map layers; the target displacement relationship between the two map layers is obtained based on the map layer space coordinates, at the corresponding map layer, of each feature point in each feature point pair; and map layer fusion is performed on the every two map layers based on the target displacement relationship between the every two map layers. The map layer space coordinates of each feature point are obtained based on the image coordinates of the corresponding feature point in the target image and the relative displacement between the capture locations of the every two frames of target images, and the relative displacement is obtained based on the motion parameter of the image capture component at the image capture locations. Therefore, compared with a related technology, the map layer space coordinates of the feature point do not need to rely on location information, provided by a GPS, of the feature point in the image. This can avoid a problem that reliability of location information determined based on a GPS signal is relatively low because the GPS signal is affected, thereby effectively improving accuracy of the map obtained through map layer fusion.

The two map layers may include a first map layer and a second map layer. An implementation process of obtaining the target displacement relationship between the two map layers based on the map layer space coordinates, at the corresponding map layer, of each feature point in each feature point pair includes: determining at least one first projection plane based on map layer space coordinates of all feature points that are at the first map layer and that belong to the plurality of feature point pairs; determining at least one second projection plane based on map layer space coordinates of all feature points that are at the second map layer and that belong to the plurality of feature point pairs, wherein the at least one first projection plane is in a one-to-one correspondence with the at least one second projection plane, and a plurality of feature points for determining each first projection plane and a plurality of feature points for determining a corresponding second projection plane are feature points that match in a one-to-one manner; constructing a projection error function with respect to a first graphic and a second graphic based on map layer space coordinates of feature points on projection planes that have a correspondence with each other, wherein the projection error function is used to represent a relationship that a projection error between the first graphic and the second graphic varies with a displacement relationship between the two map layers, the first graphic is a graphic that uses, as vertices, all the feature points that are at the first map layer and that belong to the plurality of feature point pairs, and the second graphic is a graphic that uses, as vertices, all the feature points that are at the second map layer and that belong to the plurality of feature point pairs; and determining, as the target displacement relationship, a displacement relationship that is corresponding to a minimum value of the projection error function.

The at least one first projection plane and the at least one second projection plane are determined, and the error function is constructed based on the projection planes that have a correspondence with each other, to obtain the target displacement relationship. In this way, computation in 3D space can be converted into calculation on a plane, thereby reducing computation complexity and improving calculation precision and stability.

Optionally, an implementation process of constructing the projection error function with respect to the first graphic and the second graphic based on the map layer space coordinates of the feature points on the projection planes that have a correspondence with each other may include: for each pair of a first projection plane and a second projection plane that have a correspondence with each other, constructing a projection error subfunction with respect to a first polygon and a second polygon based on map layer space coordinates of a plurality of first feature points on the first projection plane and map layer space coordinates of a plurality of second feature points on the second projection plane, wherein the projection error subfunction is used to represent a relationship that a projection error between the first polygon and the second polygon varies with the displacement relationship, the first polygon is a polygon with a largest area among polygons obtained by connecting the plurality of first feature points, and the second polygon is a polygon with a largest area among polygons obtained by connecting the plurality of second feature points; and determining, as the projection error function, a sum of one or more projection error subfunctions constructed based on at least one pair of a first projection plane and a second projection plane that have a correspondence with each other.

Optionally, before the constructing a projection error subfunction with respect to a first polygon and a second polygon based on map layer space coordinates of a plurality of first feature points on the first projection plane and map layer space coordinates of a plurality of second feature points on the second projection plane, the method may further include: determining center-of-mass coordinates of the first polygon based on the map layer space coordinates of the plurality of first feature points; and determining center-of-mass coordinates of the second polygon based on the map layer space coordinates of the plurality of second feature points.

Correspondingly, an implementation process of constructing the projection error subfunction with respect to the first polygon and the second polygon based on the map layer space coordinates of the plurality of first feature points on the first projection plane and the map layer space coordinates of the plurality of second feature points on the second projection plane may include: constructing the projection error subfunction based on the map layer space coordinates of the plurality of first feature points, the map layer space coordinates of the plurality of second feature points, the center-of-mass coordinates of the first polygon, and the center-of-mass coordinates of the second polygon.

The center-of-mass coordinates of the first polygon and the center-of-mass coordinates of the second polygon are obtained, and the projection error subfunction is constructed based on the center-of-mass coordinates. In this way, accuracy of a displacement relationship determined based on the projection subfunction can be improved. In an implementation, the displacement relationship may include a rotation relationship and a translation relationship; and map layer space coordinates $S_{ri}$ of a first feature point, map layer space coordinates $S_{li}$ of a second feature point, the center-of-mass coordinates Xr of the first polygon, the center-of-mass coordinates Xl of the second polygon, the projection error subfunction E, the rotation relationship R, and the translation relationship T satisfy the following:

$$E = \sum_{i=0}^{n} \left[ \|S_{ri} - [R \cdot S_{li} + T]\|^2 + \|Xr - [R \cdot Xl + T]\|^2 \right],$$

where
n is a total quantity of the first feature points on the first projection plane, and $\|\cdot\|$ is a norm operation.

In an implementation, an implementation process of determining the at least one first projection plane based on the map layer space coordinates of all the feature points that are at the first map layer and that belong to the plurality of feature point pairs may include: determining, in all the feature points that are at the first map layer and that belong to the plurality of feature point pairs, an initial plane based on map layer space coordinates of any three unmarked feature points, and adding the three unmarked feature points to a first target point set corresponding to the initial plane, wherein all the feature points that are at the first map layer and that belong to the plurality of feature point pairs are initially in an unmarked state; sequentially performing a screening procedure on each of other feature points until a total quantity of feature points in the first target point set reaches a preset quantity, to obtain one first target point set, and marking all feature points in the first target point set, wherein the other feature points are feature points in all the unmarked feature points except the three unmarked feature points; repeating the processes of determining an initial plane and performing a screening procedure until all the feature points that are at the first map layer and that belong to the plurality of feature point pairs are marked, to obtain at least one first target point set; and determining a first projection plane based on all feature points in each first target point set to obtain the at least one first projection plane.

For each other feature point, the screening procedure includes: when a distance from the other feature point to the initial plane is less than a preset distance threshold, determining a plurality of polygons that use, as vertices, the other feature point and all the feature points in the first target point set; and when there is a convex polygon in the plurality of polygons, adding the other feature point to the first target point set to obtain an updated first target point set.

In an implementation, an implementation process of determining the at least one second projection plane based on the map layer space coordinates of all the feature points that are at the second map layer and that belong to the plurality of feature point pairs may include: determining, in all feature points at the second map layer, one second target point set based on each first projection plane, wherein each second target point set includes a plurality of feature points that match a plurality of feature points on the first projection plane in a one-to-one manner; and determining, as a second projection plane corresponding to the first projection plane, a plane on which the plurality of feature points included in each second target point set are located, to obtain the at least one second projection plane.

The two map layers may include the first map layer and the second map layer. In an implementation, an implementation process of performing the feature point matching on the feature points at the two map layers includes: obtaining, based on both a pixel value of any first to-be-matched feature point in a first image and a pixel value of each second to-be-matched feature point in a second image, a specified parameter corresponding to the second to-be-matched feature point, wherein the specified parameter is used to indicate a difference between image information represented by the first to-be-matched feature point and the second to-be-matched feature point, the first image is any image in which the first to-be-matched feature point is located and that is in a plurality of frames of images corresponding to the first map layer, and the second image is any image in which the second to-be-matched feature point is located and that is in a plurality of frames of images corresponding to the second map layer; and determining, as a feature point that matches the first to-be-matched feature point, a second to-be-matched feature point corresponding to a smallest specified parameter.

Feature points are traversed in all the images at the second map layer, the specified parameter is calculated based on the feature point at the first map layer and each feature point at the second map layer, and the feature point corresponding to the smallest specified parameter is determined as a feature point that matches the feature point at the first map layer. In this way, matching stability and accuracy can be improved.

In another implementation, an implementation process of performing the feature point matching on the feature points at the two map layers includes: obtaining, based on a pixel value of any first to-be-matched feature point in a first image and a pixel value of any second to-be-matched feature point in a second image, a specified parameter corresponding to the second to-be-matched feature point, wherein the specified parameter is used to indicate a difference between image information represented by the first to-be-matched feature point and the second to-be-matched feature point, the first image is any image in which the first to-be-matched feature point is located and that is in a plurality of frames of images corresponding to the first map layer, and the second image is any image in which the second to-be-matched feature point is located and that is in a plurality of frames of images corresponding to the second map layer; and when the specified parameter is less than a first preset threshold, determining that the first to-be-matched feature point matches the second to-be-matched feature point.

To improve accuracy of calculating the specified parameter, an implementation process of obtaining the specified parameter corresponding to the second to-be-matched feature point may include: obtaining the specified parameter based on a pixel value of each pixel in a first image block and a pixel value of each pixel in a second image block, wherein the first image block includes a pixel corresponding to the first to-be-matched feature point, the second image block includes a pixel corresponding to the second to-be-matched feature point, and a size of the second image block is equal to a size of the first image block.

The first image and the second image each may be represented by an image pyramid including a plurality of levels of sub-images, and a plurality of levels of sub-images of the first image are in a one-to-one correspondence with a plurality of levels of sub-images of the second image. The implementation process of obtaining the specified parameter corresponding to the second to-be-matched feature point may include: obtaining, based on each level of sub-image of the first image and the corresponding level of sub-image of the second image, a specified parameter component of the corresponding level; and determining, as the specified parameter, a sum of specified parameter components corresponding to the plurality of levels of sub-images.

The images are represented by using the image pyramids, so that pixel grayscale differences and descriptor similarities of the two to-be-matched feature points can be separately calculated in case of a plurality of resolutions by using characteristics of the image pyramids. In this way, accuracy of the specified parameter and matching precision can further be improved. In addition, when feature point matching is performed based on the specified parameter obtained through calculation by using the image pyramids, matching precision and stability can be ensured.

Optionally, the specified parameter may include a pixel grayscale difference and/or a descriptor similarity.

An implementation process of performing map layer fusion on the every two map layers based on the target displacement relationship between the every two map layers, to obtain the map of the target environment may include: for at least one of the two map layers, performing coordinate transformation on map layer space coordinates of all feature points at the map layer, so that map layer space coordinates of all feature points on the map that includes feature points at the plurality of map layers are obtained based on a same reference coordinate system.

Optionally, the target environment may be a parking lot environment.

According to a second aspect of this application, a map building method is provided. The method includes: obtaining a plurality of frames of images that carry image information of a target environment, wherein the plurality of frames of images are captured by an image capture component; obtaining a motion parameter of the image capture component at a capture location of each frame of image, wherein the motion parameter is used to indicate a motion status of the image capture component; obtaining a relative displacement between capture locations of every two frames of images based on the motion parameter of the image capture component; and obtaining, based on the plurality of frames of images and the relative displacement, a map layer including feature points in the plurality of frames of images, wherein the map layer is used to build a map; and sending the map layer and the relative displacement to a server.

Optionally, the plurality of frames of images are all key-frame images that carry the image information of the target environment, and the obtaining a plurality of frames of images that carry image information of a target environment includes: obtaining a plurality of frames of to-be-screened images that carry the image information of the target environment; obtaining a target parameter of each frame of to-be-screened image, wherein the target parameter is used to indicate a variation of the to-be-screened image relative to a specified image; and when the target parameter of the to-be-screened image is greater than a second preset threshold, determining the to-be-screened image as a key-frame image.

By screening the original images captured by the image capture component, redundancy information in the obtained images can be effectively reduced, so as to reduce a calculation amount in subsequent processes of determining a target displacement relationship between map layers, performing map layer fusion, and the like.

The target parameter may include one or more of the following: a time interval between a capture time point of the to-be-screened image and a capture time point of the specified image; an angle variation between an angle of view of the image capture component during capture of the to-be-screened image and an angle of view of the image capture component during capture of the specified image; a relative displacement between a capture location of the to-be-screened image and a capture location of the specified image; a first total quantity of feature points included in the to-be-screened image; and a first ratio of a second total quantity to the first total quantity, wherein the second total quantity is a total quantity of feature points that are in the feature points included in the to-be-screened image and that are different from feature points included in the specified image.

Optionally, the plurality of frames of images are adjacent in terms of time sequence, and the specified image corresponding to each frame of to-be-screened image is a frame of key-frame image that is in the plurality of frames of images and that is prior to and closest to the to-be-screened image in terms of time sequence.

Further, when the target parameter of the to-be-screened image is greater than the second preset threshold, an implementation process of determining the to-be-screened image as a key-frame image may include: determining a second ratio of the second total quantity to a third total quantity when the target parameter of the to-be-screened image is greater than the second preset threshold, wherein the third total quantity is a total quantity of feature points included in the to-be-screened image, and the second total quantity is the total quantity of the feature points that are in the feature points included in the to-be-screened image and that are different from the feature points included in the specified image; and when the second ratio is greater than a preset ratio, determining the to-be-screened image as the key-frame image.

After it is determined that the target parameter of the to-be-screened image is greater than the second preset threshold, the to-be-screened image is further screened, so as to further reduce redundancy information.

According to a third aspect of this application, a map building apparatus is provided. The apparatus includes: a matching module, configured to perform feature point matching on feature points at every two map layers of a plurality of map layers used to build a map, to obtain a plurality of feature point pairs, wherein each feature point pair includes two feature points that are respectively from the two map layers and that match each other, each map layer includes feature points in a plurality of frames of images, and each frame of image carries image information of a target environment; an obtaining module, configured to obtain a target displacement relationship between the two map layers based on map layer space coordinates, at a corresponding map layer, of each feature point in each feature point pair, wherein the map layer space coordinates are obtained based on image coordinates of the feature point in a target image and a relative displacement between capture locations of every two frames of target images, the relative displacement is obtained based on a motion parameter of an image capture component at the image capture locations, the motion parameter is used to indicate a motion status of the image capture component, and the target image is an image in which the feature point is located; and a fusion module, configured to perform map layer fusion on the every two map layers based on the target displacement relationship between the every two map layers, to obtain a map of the target environment.

Optionally, the two map layers include a first map layer and a second map layer, and the obtaining module includes: a first determining submodule, configured to determine at least one first projection plane based on map layer space coordinates of all feature points that are at the first map layer and that belong to the plurality of feature point pairs, wherein the first determining submodule is configured to determine at least one second projection plane based on map layer space coordinates of all feature points that are at the second map layer and that belong to the plurality of feature point pairs, wherein the at least one first projection plane is in a one-to-one correspondence with the at least one second projection plane, and a plurality of feature points for determining each first projection plane and a plurality of feature points for determining a corresponding second projection plane are feature points that match in a one-to-one manner; a construction submodule, configured to construct a projection error function with respect to a first graphic and a second graphic based on map layer space coordinates of feature points on projection planes that have a correspondence with each other, wherein the projection error function is used to represent a relationship that a projection error between the first graphic and the second graphic varies with a displacement relationship between the two map layers, the first graphic is a graphic that uses, as vertices, all the feature points that are at the first map layer and that belong to the plurality of feature point pairs, and the second graphic is a graphic that uses, as vertices, all the feature points that are at the second map layer and that belong to the plurality of feature point pairs; and a second determining submodule, configured to determine, as the target displacement relationship, a displacement relationship that is corresponding to a minimum value of the projection error function.

Optionally, the first determining submodule is configured to: for each pair of a first projection plane and a second projection plane that have a correspondence with each other, construct a projection error subfunction with respect to a first polygon and a second polygon based on map layer space coordinates of a plurality of first feature points on the first projection plane and map layer space coordinates of a plurality of second feature points on the second projection plane, wherein the projection error subfunction is used to represent a relationship that a projection error between the first polygon and the second polygon varies with the displacement relationship, the first polygon is a polygon with a largest area among polygons obtained by connecting the plurality of first feature points, and the second polygon is a polygon with a largest area among polygons obtained by connecting the plurality of second feature points; and determine, as the projection error function, a sum of one or more projection error subfunctions constructed based on at least one pair of a first projection plane and a second projection plane that have a correspondence with each other.

Optionally, the obtaining module further includes: a third determining submodule, configured to determine center-of-mass coordinates of the first polygon based on the map layer space coordinates of the plurality of first feature points, wherein the third determining submodule is further configured to determine center-of-mass coordinates of the second polygon based on the map layer space coordinates of the plurality of second feature points.

The first determining submodule is configured to construct the projection error subfunction based on the map layer space coordinates of the plurality of first feature points, the map layer space coordinates of the plurality of second feature points, the center-of-mass coordinates of the first polygon, and the center-of-mass coordinates of the second polygon. Optionally, the displacement relationship includes a rotation relationship and a translation relationship; and map layer space coordinates Sr of a first feature point, map layer space coordinates Sl of a second feature point, the center-of-mass coordinates Xr of the first polygon, the center-of-mass coordinates Xl of the second polygon, the projection error subfunction E, the rotation relationship R, and the translation relationship T satisfy the following:

$$E = \sum_{i=0}^{n} \left[ \|S_{ri} - [R \cdot S_{li} + T]\|^2 + \|Xr - [R \cdot X1 + T]\|^2 \right],$$

where
n is a total quantity of the first feature points on the first projection plane, and $\|\bullet\|$ is a norm operation.

Optionally, the first determining submodule is configured to: determine, in all the feature points that are at the first map layer and that belong to the plurality of feature point pairs, an initial plane based on map layer space coordinates of any three unmarked feature points, and add the three unmarked feature points to a first target point set corresponding to the initial plane, wherein all the feature points that are at the first map layer and that belong to the plurality of feature point pairs are initially in an unmarked state; sequentially perform a screening procedure on all other feature points until a total quantity of feature points in the first target point set reaches a preset quantity, to obtain one first target point set, and mark all feature points in the first target point set, wherein the other feature points are feature points in all the unmarked feature points except the three unmarked feature points; repeat the processes of determining an initial plane and performing a screening procedure until all the feature points that are at the first map layer and that belong to the plurality of feature point pairs are marked, to obtain at least one first target point set; and determine a first projection plane based on all feature points in each first target point set to obtain the at least one first projection plane.

For each other feature point, the screening procedure includes: when a distance from the other feature point to the initial plane is less than a preset distance threshold, determining a plurality of polygons that use, as vertices, the other feature point and all the feature points in the first target point set; and when there is a convex polygon in the plurality of polygons, adding the other feature point to the first target point set to obtain an updated first target point set.

Optionally, the first determining submodule is configured to: determine, in all feature points at the second map layer, one second target point set based on each first projection plane, wherein each second target point set includes a plurality of feature points that match a plurality of feature points on the first projection plane in a one-to-one manner; and determine, as a second projection plane corresponding to the corresponding first projection plane, a plane on which the plurality of feature points included in each second target point set are located, to obtain the at least one second projection plane.

Optionally, the matching module includes: an obtaining submodule, configured to obtain, based on both a pixel value of any first to-be-matched feature point in a first image and a pixel value of each second to-be-matched feature point in a second image, a specified parameter corresponding to the second to-be-matched feature point, wherein the specified parameter is used to indicate a difference between image information represented by the first to-be-matched feature point and the second to-be-matched feature point, the first image is any image in which the first to-be-matched feature point is located and that is in a plurality of frames of images corresponding to the first map layer, and the second image is any image in which the second to-be-matched feature point is located and that is in a plurality of frames of images corresponding to the second map layer; and a fourth determining submodule, configured to determine, as a feature point that matches the first to-be-matched feature point, a second to-be-matched feature point corresponding to a smallest specified parameter.

Optionally, the matching module includes: an obtaining submodule, configured to obtain, based on a pixel value of any first to-be-matched feature point in a first image and a pixel value of any second to-be-matched feature point in a second image, a specified parameter corresponding to the second to-be-matched feature point, wherein the specified parameter is used to indicate a difference between image information represented by the first to-be-matched feature point and the second to-be-matched feature point, the first image is any image in which the first to-be-matched feature point is located and that is in a plurality of frames of images corresponding to the first map layer, and the second image is any image in which the second to-be-matched feature point is located and that is in a plurality of frames of images corresponding to the second map layer; and a fourth determining submodule, configured to: when the specified parameter is less than a first preset threshold, determine that the first to-be-matched feature point matches the second to-be-matched feature point.

Optionally, the obtaining submodule is configured to obtain the specified parameter based on a pixel value of each pixel in a first image block and a pixel value of each pixel in a second image block, wherein the first image block includes a pixel corresponding to the first to-be-matched feature point, the second image block includes a pixel corresponding to the second to-be-matched feature point, and a size of the second image block is equal to a size of the first image block.

Optionally, both of the first image and the second image are represented by an image pyramid including a plurality of levels of sub-images, and a plurality of levels of sub-images of the first image are in a one-to-one correspondence with a plurality of levels of sub-images of the second image; and the obtaining submodule is configured to: obtain, based on each level of sub-image of the first image and the corresponding level of sub-image of the second image, a specified parameter component of the corresponding level; and determine, as the specified parameter, a sum of specified parameter components corresponding to the plurality of levels of sub-images.

Optionally, the specified parameter includes a pixel grayscale difference and/or a descriptor similarity.

Optionally, the fusion module is configured to: for at least one of the two map layers, perform coordinate transformation on map layer space coordinates of all feature points at the map layer, so that map layer space coordinates of all feature points on the map that includes feature points at the plurality of map layers are obtained based on a same reference coordinate system.

Optionally, the target environment is a parking lot environment.

According to a fourth aspect of this application, a map building apparatus is provided. The apparatus includes: a first obtaining module, configured to obtain a plurality of frames of images that carry image information of a target environment, wherein the plurality of frames of images are captured by an image capture component; a second obtaining module, configured to obtain a motion parameter of the image capture component at a capture location of each frame of image, wherein the motion parameter is used to indicate a motion status of the image capture component; a third obtaining module, configured to obtain a relative displacement between capture locations of every two frames of images based on the motion parameter of the image capture component; a fourth obtaining module, configured to obtain, based on the plurality of frames of images and the relative displacement, a map layer including feature points in the plurality of frames of images, wherein the map layer is used to build a map; and a sending module, configured to send the map layer and the relative displacement to a server.

Optionally, the plurality of frames of images are all key-frame images that carry the image information of the target environment, and the first obtaining module is configured to: obtain a plurality of frames of to-be-screened images that carry the image information of the target environment; obtain a target parameter of each frame of to-be-screened image, wherein the target parameter is used to indicate a variation of the to-be-screened image relative to a specified image; and when the target parameter of the to-be-screened image is greater than a second preset threshold, determine the to-be-screened image as a key-frame image.

Optionally, the target parameter includes one or more of the following: a time interval between a capture time point of the to-be-screened image and a capture time point of the specified image; an angle variation between an angle of view of the image capture component during capture of the to-be-screened image and an angle of view of the image capture component during capture of the specified image; a relative displacement between a capture location of the to-be-screened image and a capture location of the specified image; a first total quantity of feature points included in the to-be-screened image; and a first ratio of a second total quantity to the first total quantity, wherein the second total quantity is a total quantity of feature points that are in the feature points included in the to-be-screened image and that are different from feature points included in the specified image.

Optionally, the plurality of frames of images are adjacent in terms of time sequence, and the specified image corresponding to each frame of to-be-screened image is a frame of key-frame image that is in the plurality of frames of images and that is prior to and closest to the to-be-screened image in terms of time sequence.

Optionally, the first obtaining module is configured to: determine a second ratio of the second total quantity to a third total quantity when the target parameter of the to-be-screened image is greater than the second preset threshold, wherein the third total quantity is a total quantity of feature points included in the to-be-screened image, and the second total quantity is the total quantity of the feature points that are in the feature points included in the to-be-screened image and that are different from the feature points included in the specified image; and when the second ratio is greater than a preset ratio, determine the to-be-screened image as the key-frame image.

According to a fifth aspect of this application, a map building system is provided. The system includes a terminal and a server. The terminal includes the map building apparatus according to any one of the fourth aspect or the implementations of the fourth aspect, and the server includes the map building apparatus according to any one of the third aspect or the implementations of the third aspect.

Optionally, the terminal may be configured on an image capture vehicle, and the image capture vehicle is configured to capture image information of a target environment.

According to a sixth aspect of this application, a map building apparatus is provided, including a processor and a memory. When the processor executes a computer program stored in the memory, the map building method according to any one of the first aspect or the implementations of the first aspect is performed, or the map building method according to any one of the second aspect or the implementations of the second aspect is performed.

According to a seventh aspect of this application, a storage medium is provided. The storage medium stores a computer program. When the computer program is run on a computer, the computer is enabled to perform the method according to any one of the first aspect or the possible implementations of the first aspect, or the computer is enabled to perform the method according to any one of the second aspect or the possible implementations of the second aspect.

BRIEF DESCRIPTION OF DRAWINGS

FIG. 7 is a schematic diagram of representing an image by using an image pyramid according to an embodiment of this application;

FIG. 8 is a flowchart of a method for performing feature point matching on a first to-be-matched feature point and a second to-be-matched feature point during feature point matching on a feature point in a first image and a feature point in a second image according to an embodiment of this application;

FIG. 9 is a flowchart of a method for searching for an optimal matching feature point during feature point matching on a feature point at a first map layer and a feature point at a second map layer according to an embodiment of this application;

FIG. 14 is a schematic diagram of an interior angle formed by another feature point X4, a point X2, and a point X3 according to an embodiment of this application;

FIG. 15 is a flowchart of a method for determining at least one second projection plane based on map layer space coordinates, at a corresponding map layer, of all feature points that are at a second map layer and that belong to a plurality of feature point pairs according to an embodiment of this application;

DESCRIPTION OF EMBODIMENTS

To make the objectives, technical solutions, and advantages of this application clearer, the following further describes the implementations of this application in detail with reference to the accompanying drawings.

Figure 1:
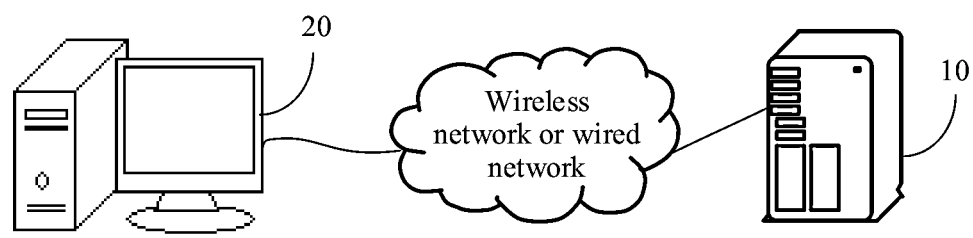
FIG. 1 is a schematic structural diagram of a map building system used in a map building method according to an embodiment of this application.

FIG. 1 is a schematic structural diagram of a map building system used in a map building method according to an embodiment of this application. Referring to FIG. 1, there may be a server 10 and a terminal 20 in the implementation environment. A connection may be established between the server 10 and the terminal 20 through a wired or wireless network.

The server 10 may be one server, a server cluster including several servers, or a cloud computing service center. The terminal 20 may be a computer. The computer may be a machine having a computing function, such as a general-purpose computer, a special-purpose computer, a personal computer, or a smartphone.

The terminal 20 may obtain a plurality of frames of images that carry image information of a target environment, and obtain a motion parameter of an image capture component at capture locations of different images, wherein the motion parameter is used to indicate a motion status of the image capture component; obtain a relative displacement between the capture locations of the different images based on the motion parameter of the image capture component; and obtain, based on the plurality of frames of images and the corresponding relative displacement, a map layer including feature points in the plurality of frames of images, wherein the map layer is used to build a map; and send the map layer and the relative displacement to the server. The image capture component may be integrated into the terminal 20. In this case, the terminal 20 may capture an image by using the image capture component, to obtain the image. Alternatively, the terminal 20 may be connected to the image capture component. After capturing an image, the image capture component may send the captured image to the terminal 20, so that the terminal 20 obtains the image. In an implementation, the image capture component may include a camera. The motion parameter may be obtained by using a motion sensor or the camera.

For example, the target environment may be a parking lot environment, the terminal 20, a camera, and an inertial measurement unit (IMU) may be fixedly disposed on an image capture vehicle, wherein both the camera and the inertial measurement unit are connected to the terminal 20. In a process in which the image capture vehicle travels in the parking lot environment, the camera may capture an image of the parking lot environment, and may send the captured image to the terminal 20 after capturing the image of the parking lot environment. The inertial measurement unit may obtain a motion parameter of the image capture vehicle in the traveling process, such as a pitch angle (pitch), a roll angle (roll), a yaw angle (yaw), an acceleration, and/or an angular velocity, and send the motion parameter to the terminal 20. In addition, because both the camera and the inertial measurement unit are fixedly disposed on the image capture vehicle, the motion parameter of the image capture vehicle is a motion parameter of the camera. After obtaining the image and the motion parameter, the terminal 20 may determine a motion parameter of the camera at an image capture location of each frame of image by performing spatial location calibration on the image captured by the camera and performing time synchronization processing on the image captured by the camera and the motion parameter obtained by the inertial measurement unit. In addition, because costs of the camera and the inertial measurement unit are relatively low, hardware costs of the map building system can be reduced by capturing an image by the camera and obtaining a motion parameter by the inertial measurement unit.

Optionally, before sending the images to the server, the terminal 20 may further perform image preprocessing on the plurality of frames of images, and then send images obtained after image preprocessing to the server 10. For example, the image preprocessing may include: obtaining feature points (landmark) from the images, and/or determining a key frame (KF) image from the plurality of frames of images. The key-frame image is an image having an obvious scenario differentiation degree. The key-frame image may carry image information, feature point information, timestamp information of the key-frame image, location information of the image capture component when the image capture component captures the key-frame image, posture information of the image capture component when the image capture component captures the key-frame image, and the like. When the image capture component is fixedly disposed on the image capture vehicle, the location information of the image capture component when the image capture component captures the key-frame image may be considered as location information of the image capture vehicle when the image capture component captures the key-frame image, and the posture information of the image capture component when the image capture component captures the key-frame image may be considered as posture information of the image capture vehicle when the image capture component captures the key-frame image. The posture information may be a motion parameter corresponding to the image capture vehicle, such as a pitch angle, a roll angle, or a yaw angle.

The server 10 may perform feature point matching on feature points at different map layers based on the map layers sent by the terminal 20 to the server 10, to obtain a plurality of feature point pairs. A displacement relationship between every two map layers is obtained based on map layer space coordinates, at a corresponding map layer, of each feature point in the plurality of feature point pairs. Map layer fusion is performed on the two map layers based on the displacement relationship, to obtain a map of the target environment. Feature points included in each feature point pair are used to represent a same object in the target environment. The map layer space coordinates, at the corresponding map layer, of each feature point are obtained based on image coordinates of the feature point in a target image and a relative displacement between capture locations of every two frames of target images. Optionally, the server may be a cloud-side server, so as to process data by using a resource on a cloud side.

For example, when the target environment is a parking lot environment, a plurality of map layers may be obtained by capturing images in the parking lot environment for a plurality of times. A plurality of feature point pairs may be obtained by performing feature point matching on feature points at different map layers. A displacement relationship between the different map layers may be obtained based on map layer space coordinates, at a corresponding map layer, of each feature point in the plurality of feature point pairs. A map (also referred to as a localization map layer) of the parking lot may be obtained by performing map layer fusion on the different map layers based on the displacement relationship.

A plurality of frames of images may be obtained in each image capture process, and a plurality of feature points may be determined based on the plurality of frames of images. In addition, a relative displacement between the plurality of feature points may be obtained based on a motion parameter obtained by the inertial measurement unit, and then a map layer (also referred to as a submap) including the plurality of feature points may be determined based on the relative displacement and the plurality of feature points. In addition, each map layer has an anchor point (AP). The anchor point is a mark point at the map layer. For example, an anchor point at each map layer may be a location corresponding to a start moment in each capture process. A target displacement relationship between different map layers may be considered as a displacement relationship between anchor points at the different map layers. Map layer space coordinates, at a corresponding map layer, of a feature point are space coordinates determined based on a coordinate system established by using an anchor point at the map layer as an origin of coordinates.

For example, the image capture vehicle captures images of the parking lot environment twice on one day, time periods of the two times of capture are 11:00 to 12:00 and 14:00 to 15:00, a map layer may be determined based on a plurality of frames of images captured from 11:00 to 12:00, another map layer may be determined based on a plurality of frames of images captured from 14:00 to 15:00, and an anchor point at each map layer is a location corresponding to a start moment in a corresponding capture process.

A feature point is used for describing information having an obvious semantic feature in a target environment. Each feature point has a feature point serial number, and the feature point serial number is used to uniquely identify the feature point. According to content represented by feature points, the feature points may include a semantic feature point and a geometric feature point. The semantic feature point may be a set of pixels with an obvious semantic feature in an image. For example, semantic feature points used in this embodiment of this application may include sets of pixels used to represent semantic features such as a lane line, a road surface marking, a traffic sign, a vehicle, and a pedestrian. A visual geometric feature point may be a set of pixels with an obvious visual feature in an image. For example, visual geometric feature points used in this embodiment of this application may include a set of pixels used to represent a point, a straight line, a plane, a broken line, or a corner point (CP), a set of pixels used to represent a vertex on a lane line segment, and a set of pixels used to represent that an image has obvious black and white contrast. According to a spatial dimension of feature points, the feature points may include a 2D (dimension) feature point and a 3D feature point. The 2D feature point is a feature point in image space. The 3D feature point is a feature point on a physical object in three-dimensional space. Optionally, a feature point in this embodiment of this application may be an ORB (oriented FAST and rotated BRIEF) feature point or the like. In addition, when a grayscale value difference between sufficient neighborhood pixels in a neighborhood of a feature point and the feature point is greater than a preset grayscale threshold, it may be determined that the feature point is an ORB feature point.

When the target environment is a parking lot environment, if the foregoing feature points are used in the map building method provided in this embodiment of this application, compared with a related technology in which semantic feature points such as a lane line and a traffic sign are used, because the parking lot environment includes a relatively large quantity of the foregoing feature points and includes a relatively small quantity of semantic feature points such as a lane line and a traffic sign, a success rate of feature point matching can be increased when feature point matching is performed based on the feature points, thereby avoiding a case in which matching cannot be performed due to a relatively small quantity of feature points.

Figure 2:
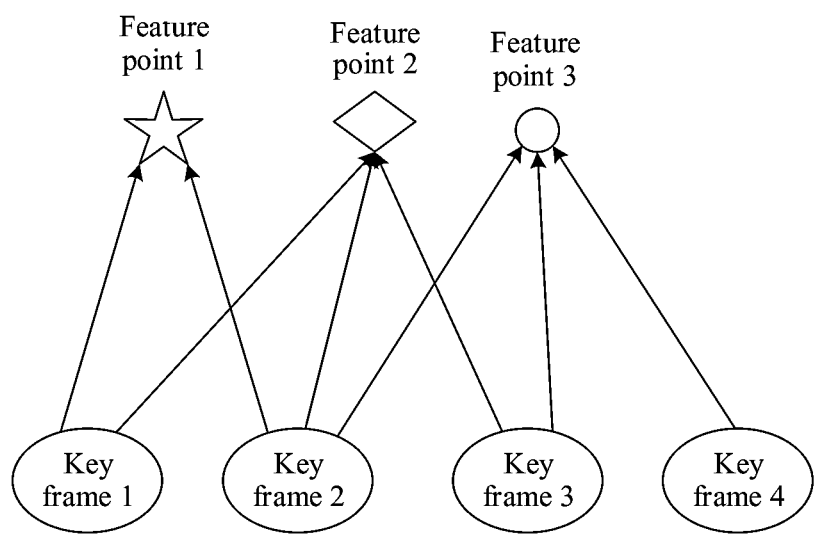
FIG. 2 is a schematic diagram of a relationship between key frames and feature points according to an embodiment of this application.

A feature point in each frame of image may include at least one pixel in the image. In addition, a plurality of feature points may exist in each frame of image, and each feature point may also exist in a plurality of frames of images. For example, referring to FIG. 2, a feature point 1 and a feature point 2 exist in a key frame 1, the feature point 1, the feature point 2, and a feature point 3 exist in a key frame 2, the feature point 2 and the feature point 3 exist in a key frame 3, and the feature point 3 exists in a key frame 4.

It should be noted that all actions performed in the server 10 may also be performed in the terminal 20. Alternatively, an action of performing image preprocessing on an image may be performed by the server 10. For example, after obtaining the plurality of frames of images and the motion parameter, the terminal 20 may directly send the plurality of frames of images and the motion parameter to the server 10. The server 10 may obtain a feature point from each frame of image, and determine a key-frame image from the plurality of frames of images, and then perform operations such as obtaining a map layer based on the key-frame image, performing feature point matching, determining a displacement relationship between different map layers, and performing map layer fusion based on the displacement relationship.

Figure 3:
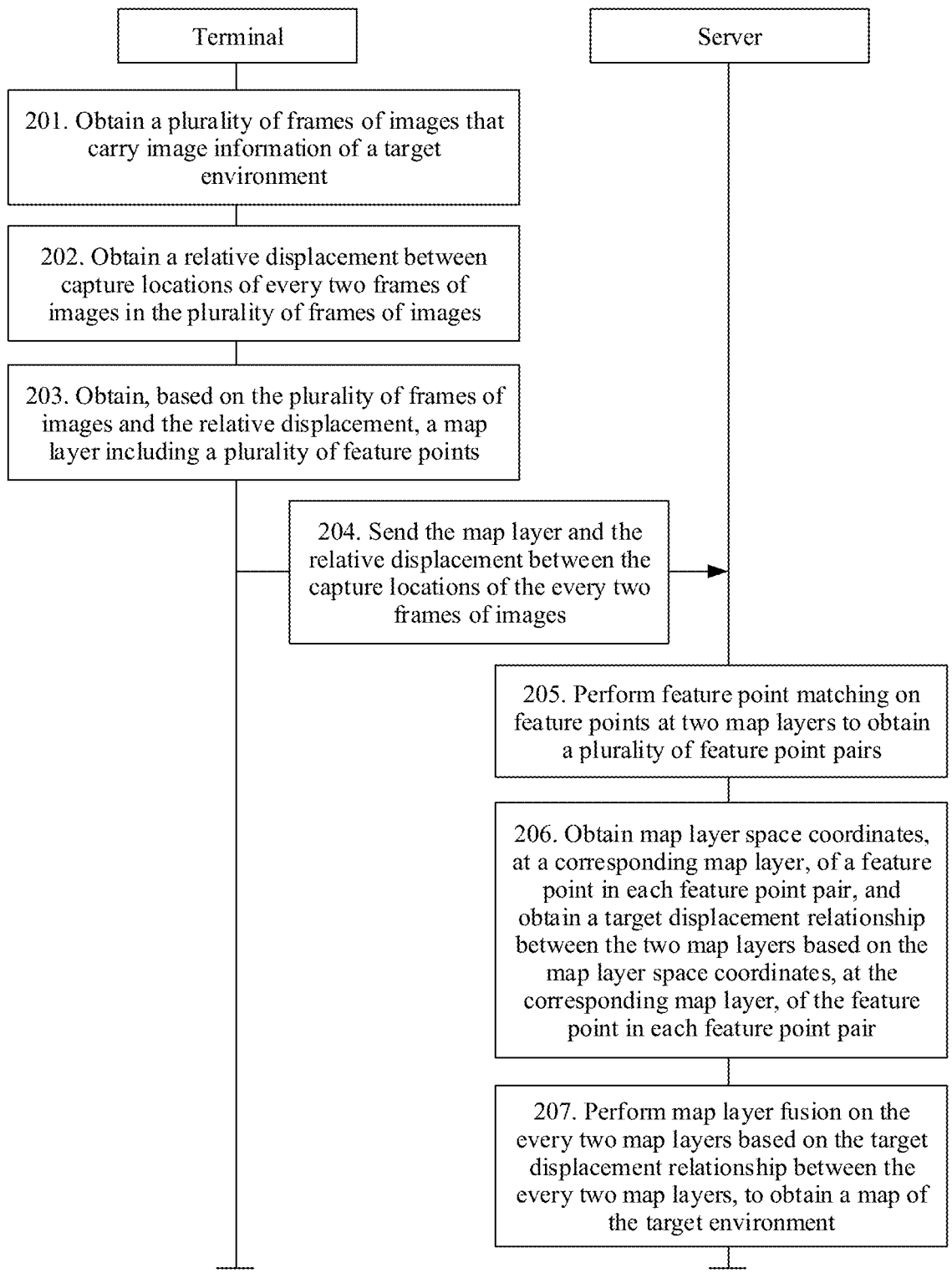
FIG. 3 is a flowchart of a map building method according to an embodiment of this application.

FIG. 3 is a flowchart of a map building method according to an embodiment of this application. In a map layer fusion process, usually, there are a plurality of to-be-fused map layers. In this embodiment of this application, a map layer fusion process of a first map layer and a second map layer is used as an example for describing an implementation process of the map building method. For a map layer fusion process of other to-be-fused map layers, correspondingly refer to the map layer fusion process of the first map layer and the second map layer. The first map layer and the second map layer are any two of the plurality of map layers. As shown in FIG. 3, the method may include the following steps.

Step 201. A terminal obtains a plurality of frames of images that carry image information of a target environment.

The plurality of frames of images may be captured by an image capture component. The image capture component may be integrated into the terminal, or the image capture component may be connected to the terminal. After capturing an image, the image capture component may send the captured image to the terminal, so that the terminal obtains the plurality of frames of images.

Optionally, the plurality of frames of images may be original images captured by the image capture component, or may be images obtained after screening is performed on the original images. For example, all the plurality of frames of images may be key-frame images obtained after screening is performed on the original images captured by the image capture component. By screening the original images captured by the image capture component, redundancy information in the obtained images can be effectively reduced, so as to reduce a calculation amount in subsequent processes of determining a target displacement relationship between map layers, performing map layer fusion, and the like.

Figure 4:
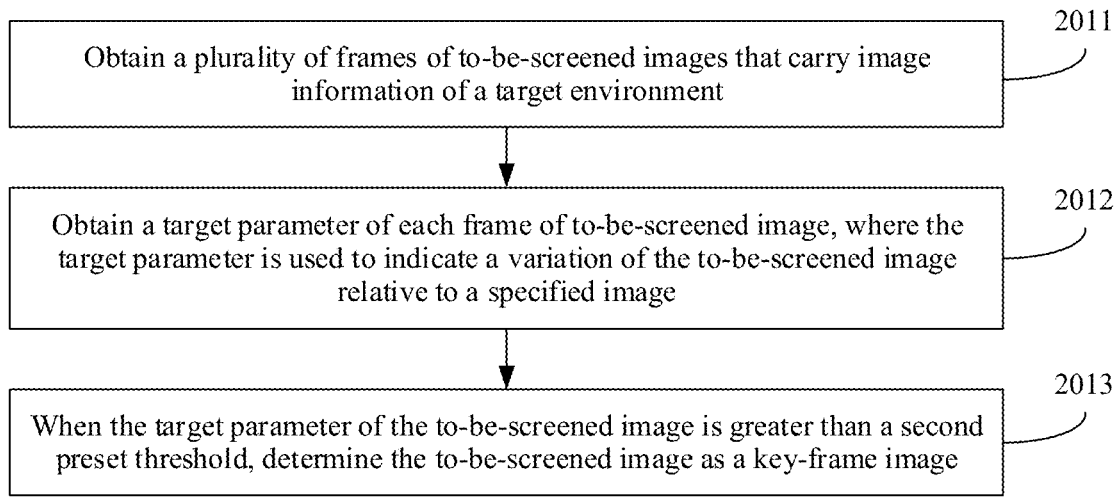
FIG. 4 is a flowchart of a method for screening images to obtain a key-frame image according to an embodiment of this application.

As shown in FIG. 4, an implementation process of performing image screening to obtain a key-frame image may include the following steps.

Step 2011. Obtain a plurality of frames of to-be-screened images that carry the image information of the target environment.

The plurality of frames of to-be-screened images may be the original images captured by the image capture component. In addition, the images may be color images (for example, RGB color images) or grayscale images.

Step 2012. Obtain a target parameter of each frame of to-be-screened image, wherein the target parameter is used to indicate a variation of the to-be-screened image relative to a specified image.

The target parameter may include one or more of the following: a time interval between a capture time point of the to-be-screened image and a capture time point of the specified image; an angle variation between an angle of view of the image capture component during capture of the to-be-screened image and an angle of view of the image capture component during capture of the specified image; a relative displacement between a capture location of the to-be-screened image and a capture location of the specified image; a first total quantity of feature points included in the to-be-screened image; and a first ratio of a second total quantity to the first total quantity, wherein the second total quantity is a total quantity of feature points that are in the feature points included in the to-be-screened image and that are different from feature points included in the specified image.

Optionally, a camera and an inertial measurement unit each have a clock system, and an image capture time point may be determined by using the clock system. A motion parameter of the image capture component may be obtained by using the inertial measurement unit, and an angle of view of the image capture component during capture of an image and a relative displacement between a capture location of the image and a capture location of the specified image may be obtained based on the motion parameter. In addition, when the target parameter of the to-be-screened image includes the first total quantity and/or the first ratio, before the target parameter is obtained, the feature points in the image may be first obtained, to obtain the first total quantity and/or the first ratio based on the feature points in the image.

In addition, the specified image may be determined depending on an actual requirement. For example, when the plurality of frames of images are adjacent in terms of time sequence, the specified image corresponding to each frame of to-be-screened image may be a frame of key-frame image that is in the plurality of frames of images and that is prior to and closest to the to-be-screened image in terms of time sequence. In other words, the specified image corresponding to each frame of to-be-screened image may be a previous frame of key-frame image of the to-be-screened image. Correspondingly, the target parameter may include one or more of the following: a time interval between the capture time point of the to-be-screened image and a capture time point of the previous frame of key-frame image; an angle variation between the angle of view of the image capture component during capture of the to-be-screened image and an angle of view of the image capture component during capture of the previous frame of key-frame image; a relative displacement between the capture location of the image and a capture location of the previous frame of key-frame image; the first total quantity of the feature points included in the to-be-screened image; and a first ratio of a second total quantity to the first total quantity, wherein the second total quantity is a total quantity of feature points that are in the feature points included in the to-be-screened image and that are different from feature points included in the previous frame of key-frame image.

An implementation process of determining whether two feature points are a same feature point may include: calculating parameters such as descriptor similarities of each feature point in the to-be-screened image and each feature point in the specified image; and when the parameters corresponding to the two feature points are greater than a preset parameter threshold, determining that the two feature points are a same feature point. A descriptor is used to describe a feature point from a vision perspective. Common descriptors may include an ORB descriptor, a scale-invariant feature transform (SIFT) descriptor, and the like.

The to-be-screened images are screened based on a time interval, an angle variation, a relative displacement, and/or feature point-related information, so that the images can be screened in different capture conditions. For example, images captured when an image capture vehicle is in a plurality of states such as low-speed driving, high-speed driving, straight-line driving, or turning a corner may be screened. Alternatively, images captured in different weather and different light conditions may be screened. Because the images can be screened in different capture conditions, if map layer fusion is performed based on images obtained after screening, precision of a map layer obtained through fusion can be ensured.

Step 2013. When the target parameter of the to-be-screened image is greater than a second preset threshold, determine the to-be-screened image as a key-frame image.

When the target parameter of the to-be-screened image includes the time interval between the capture time point of the to-be-screened image and the capture time point of the specified image, if the time interval is greater than the second preset threshold, it indicates that there is no key frame within a limited time interval. In this case, the to-be-screened image may be determined as a key-frame image, and image information included in the to-be-screened image is recorded.

When the target parameter of the to-be-screened image includes the angle variation between the angle of view of the image capture component during capture of the to-be-screened image and the angle of view of the image capture component during capture of the specified image, because the image capture component is fixed on the image capture vehicle, an angle of view variation of the image capture component may be considered as a rotation angle of the image capture vehicle. If the angle variation is greater than the second preset threshold, it indicates that the rotation angle of the image capture vehicle changes relatively greatly, and that space coordinates of a space point corresponding to a feature point included in the to-be-screened image also change relatively greatly relative to space coordinates of a space point corresponding to a feature point in the specified image. In this case, the to-be-screened image may be determined as a key-frame image, and image information included in the to-be-screened image is recorded.

When the target parameter of the to-be-screened image includes the relative displacement between the capture location of the to-be-screened image and the capture location of the specified image, because the image capture component is fixed on the image capture vehicle, the relative displacement may be considered as a displacement between a location of the image capture vehicle during capture of the to-be-screened image and a location of the image capture vehicle during capture of the specified image. If the relative displacement is greater than the second preset threshold, it indicates that a location of the image capture vehicle changes relatively greatly, and that space coordinates of a space point corresponding to a feature point included in the to-be-screened image also change relatively greatly relative to space coordinates of a space point corresponding to a feature point in the specified image. In this case, the to-be-screened image may be determined as a key-frame image, and image information included in the to-be-screened image is recorded.

When the target parameter of the to-be-screened image includes the first total quantity of the feature points included in the to-be-screened image, if the first total quantity is greater than the second preset threshold, it indicates that the to-be-screened image includes sufficient feature points. In this case, the to-be-screened image may be determined as a key-frame image, and image information included in the to-be-screened image is recorded.

When the target parameter of the to-be-screened image includes the first ratio of the second total quantity to the first total quantity, the first ratio is used to reflect a ratio between the feature points that are in the to-be-screened image and that are different from the feature points in the specified image and the feature points that are in the to-be-screened image. Correspondingly, the first ratio can reflect a coincidence degree between the feature points in the to-be-screened image and the feature points in the specified image. If the first ratio is greater than the second preset threshold, it indicates that the coincidence degree between the feature points in the to-be-screened image and the feature points in the specified image is relatively small, and that image information in the to-be-screened image is of a relatively great reference value. In this case, the to-be-screened image may be determined as a key-frame image, and image information included in the to-be-screened image is recorded.

When the target parameter of the image includes different content, the second preset threshold corresponding to the target parameter of the image may be set depending on an actual requirement. For example, when the target parameter of the image includes the time interval between the capture time point of the image and the capture time point of the specified image, the second preset threshold may be 150 milliseconds. When the target parameter of the image includes the angle variation between the angle of view of the image capture component during capture of the image and the angle of view of the image capture component during capture of the specified image, the second preset threshold may be 30 degrees. When the target parameter of the image includes the relative displacement between the capture location of the image and the capture location of the specified image, the second preset threshold may be 10 meters. In addition, when the target parameter of the image includes a plurality of parameters, a second preset threshold corresponding to each of the plurality of parameters may also be set depending on an actual requirement.

Figure 5:
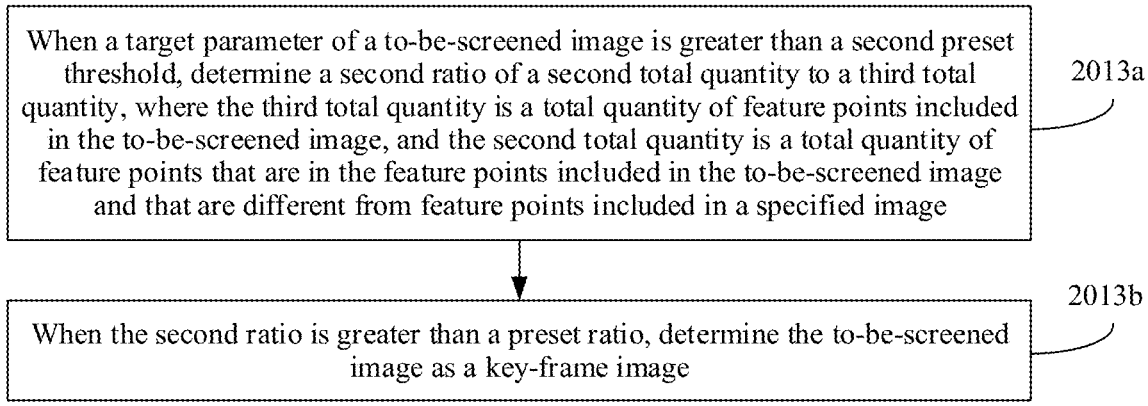
FIG. 5 is a flowchart of a method for further screening a to-be-screened image when a target parameter of the image is greater than a second preset threshold according to an embodiment of this application.

It should be noted that, after it is determined that the target parameter of the to-be-screened image is greater than the second preset threshold, the to-be-screened image may further be screened; and when the to-be-screened image satisfies a screening condition, the to-be-screened image is determined as a key-frame image to further reduce redundancy of image information. This facilitates sparse calculation in a subsequent feature point matching process, thereby accelerating the feature point matching process. For example, after it is determined that target parameters of to-be-screened images are greater than the second preset threshold, the to-be-screened images whose target parameters are greater than the second preset threshold may further be classified, and a to-be-screened image that satisfies a classification condition is determined as a key-frame image. For example, referring to FIG. 5, the implementation process may include the following steps.

Step 2013*a*. When the target parameter of the to-be-screened image is greater than the second preset threshold, determine a second ratio of the second total quantity to a third total quantity, wherein the third total quantity is a total quantity of feature points included in the to-be-screened image, and the second total quantity is a total quantity of feature points that are in the feature points included in the to-be-screened image and that are different from feature points included in the specified image.

The feature points in the to-be-screened image and the feature points in the specified image may be obtained, and then the total quantity of the feature points included in the to-be-screened image is counted to obtain the third total quantity. The feature points that are in all the feature points included in the to-be-screened image and that are different from the feature points included in the specified image are determined, and then the total quantity of the different feature points is counted to obtain the second total quantity. In a process of determining the feature points that are in all the feature points included in the to-be-screened image and that are different from the feature points included in the specified image, parameters such as descriptor similarities of each feature point in the to-be-screened image and each feature point in the specified image may be calculated; when the parameters corresponding to the two feature points are greater than the preset parameter threshold, it is determined that the two feature points are a same feature point; and a total quantity of feature points that are in the to-be-screened image and that are the same as those in the specified image is counted, and a difference between the third total quantity and the total quantity of the same feature points is determined as the second total quantity. Optionally, the feature points in the image may be obtained by using an algorithm such as an SIFT algorithm or a Harris corner detection algorithm.

Step 2013b. When the second ratio is greater than a preset ratio, determine the to-be-screened image as a key-frame image.

When the second ratio is greater than the preset ratio, it indicates that a coincidence degree between the feature points in the to-be-screened image and the feature points in the specified image is relatively small, and that image information in the to-be-screened image is of a relatively great reference value. Therefore, the to-be-screened image may be determined as a key-frame image. The preset ratio may be determined depending on an actual requirement. For example, the preset ratio may be 20%.

When the target parameter includes at least one of a time interval between image capture time points, an angle variation of angles of view of the image capture component, a relative displacement between image capture locations, and a first total quantity, because the target parameter mainly represents an image variation in a time dimension, an angle dimension, a distance dimension and/or an amount of information. If the target parameter of the to-be-screened image is greater than the second preset threshold, the to-be-screened image is determined as a key-frame image. The key-frame image may further include a relatively large amount of redundancy information. In addition, when the target parameter includes the first ratio, if the second preset threshold is relatively small, a to-be-screened image whose corresponding target parameter is greater than the second preset threshold is determined as a key-frame image. The key-frame image may further include a relatively large amount of redundancy information. Therefore, after it is determined that the target parameter of the to-be-screened image is greater than the second preset threshold, the to-be-screened image may further be screened, to further reduce redundancy information.

For example, when the image capture vehicle is in a stationary state at a location in a time period, a new image is captured at a fixed time interval dt, but in the time period, information such as a location, a posture, and a speed of the image capture vehicle does not change, and a feature point in the image captured in the time period also keeps almost unchanged. Therefore, the image captured in the time period may be replaced by another image, that is, the image captured in the time period includes a relatively large amount of redundancy information. However, when the target parameter is the time interval between the capture time point of the to-be-screened image and the capture time point of the specified image, and duration of the time period is greater than the second preset threshold, the image captured in the time period is determined as a key-frame image. The key-frame image may further include a relatively large amount of redundancy information. In this case, the image whose target parameter is greater than the second preset threshold is further screened, and when a second ratio corresponding to the to-be-screened image is greater than the preset ratio, the to-be-screened image is determined as a key-frame image. In this way, an image including a relatively large amount of different image information and feature point information may be determined as a key frame, so as to reduce a calculation amount and computation complexity of a subsequent process.

A value of the preset ratio may be determined depending on an actual requirement. For example, the value of the preset ratio may be determined based on an amount of information for map layer fusion. For example, when an initially selected preset ratio is X0, if it is determined, through judgment, that information included in a key-frame image determined based on the preset ratio is insufficient for map layer fusion, the value of the preset ratio may be appropriately reduced, so that information included in a key-frame image determined based on a reduced preset ratio is sufficient for map layer fusion.

Step 202. The terminal obtains a relative displacement between capture locations of every two frames of images in the plurality of frames of images.

An implementation process of step 202 may include the following steps.

Step 2021. Obtain a motion parameter of the image capture component at a capture location of each frame of image.

The motion parameter is used to indicate a motion status of the image capture component. The motion parameter may be a parameter of the image capture component, such as a pitch angle, a roll angle, a yaw angle, an acceleration, and/or an angular velocity.

The motion parameter of the image capture component may be captured by using the inertial measurement unit. The inertial measurement unit may obtain a motion parameter of the image capture vehicle according to first preset frequency. In addition, because both the inertial measurement unit and the image capture component are fixed on the image capture vehicle, the motion parameter of the image capture vehicle measured by the inertial measurement unit is the motion parameter of the image capture component. The image capture component may capture an image according to second preset frequency, and a motion parameter of the image capture component at an image capture location of each frame of image may be determined by performing spatial location calibration on the image captured by the image capture component and performing time synchronization processing on the image captured by the image capture component and the motion parameter obtained by the inertial measurement unit.

Step 2023. Obtain a relative displacement between capture locations of every two frames of images based on the motion parameter of the image capture component.

After the motion parameter of the capture image component at the image capture location for capturing each frame of image is obtained, the relative displacement between the capture locations of the every two frames of images may be determined based on a motion parameter of each of the two frames of images and a time interval for capturing the two frames of images.

Usually, because the plurality of frames of images captured by the image capture component are images that are adjacent in terms of time sequence, during subsequent image processing, image processing needs to be performed only on every two frames of images that are adjacent in terms of time sequence. Therefore, during obtaining of the relative displacement between the capture locations of the every two frames of images, only a relative displacement between image capture locations of every two frames of images that are adjacent in terms of time sequence needs to be obtained, so as to reduce a calculation amount.

Step 203. The terminal obtains, based on the plurality of frames of images and the relative displacement, a map layer including a plurality of feature points.

A feature point in each frame of image may be obtained based on the plurality of frames of images. Feature point matching is performed on feature points in the every two frames of images, to determine feature points used to represent a same object in the target environment and a plurality of frames of images in which the feature points are located. A displacement relationship between different feature points located in different images may be determined based on all feature points included in each frame of image of the plurality of frames of images and the motion parameter obtained by the inertial measurement unit, and a map layer including a plurality of feature points is established based on the displacement relationship between the different feature points. The plurality of frames of images may be images captured in one image capture process. In addition, because the plurality of frames of images are captured in one image capture process, when the displacement relationship between the feature points is determined based on the motion parameter obtained by the inertial measurement unit, accuracy of the determined displacement relationship can be ensured. Moreover, it can be ensured that map layer space coordinates of all the feature points at the map layer are coordinates obtained in one coordinate system, thereby ensuring location reference consistency of all the feature points at the map layer.

There may be a plurality of implementations of performing feature point matching on the feature points in the two frames of images. In this embodiment of this application, the following two implementations are used as examples for description.

Figure 6:
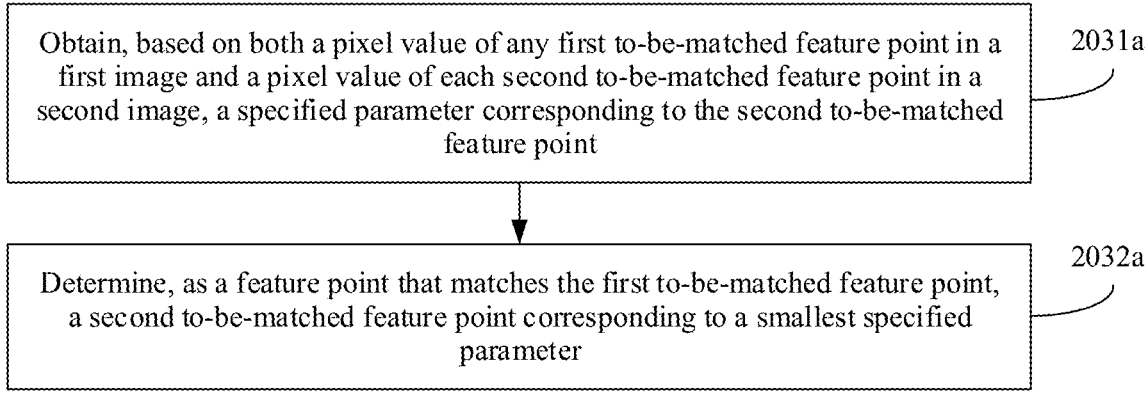
FIG. 6 is a flowchart of a method for searching for an optimal matching feature point during feature point matching on a feature point in a first image and a feature point in a second image according to an embodiment of this application.

In an implementation of performing feature point matching on the feature points in the two frames of images, for any first to-be-matched feature point in a first image, a plurality of feature points included in a second image may be searched for an optimal matching feature point of the first to-be-matched feature point. As shown in FIG. 6, an implementation process of searching for the optimal matching feature point may include the following steps.

Step 2031a. Obtain, based on both a pixel value of the any first to-be-matched feature point in the first image and a pixel value of each second to-be-matched feature point in the second image, a specified parameter corresponding to the second to-be-matched feature point.

The specified parameter is used to indicate a difference between image information represented by the first to-be-matched feature point and the second to-be-matched feature point. Optionally, the specified parameter may include a pixel grayscale difference and/or a descriptor similarity. In addition, when the specified parameter includes the pixel grayscale difference and the descriptor similarity, a value of the specified parameter is a sum of a value of the pixel grayscale difference and a value of the descriptor similarity. A descriptor may be an ORB descriptor. The ORB descriptor is used to describe an ORB feature point, and the ORB descriptor may include a matrix used to indicate a pixel value relationship between a feature point and a neighborhood pixel, and a gradient direction of a pixel value of the feature point.

Optionally, to improve accuracy of calculating the specified parameter, during obtaining of the specified parameter corresponding to the second to-be-matched feature point, the specified parameter may be obtained based on a pixel value of each pixel in a first image block and a pixel value of each pixel in a second image block. The first image block includes a pixel corresponding to the first to-be-matched feature point, the second image block includes a pixel corresponding to the second to-be-matched feature point, and a size of the second image block is equal to a size of the first image block. The size of the image block may be determined depending on an actual requirement, and the feature point may be represented by a pixel in a central region of the image block.

Further, the first image and the second image each may be represented by an image pyramid including a plurality of levels of sub-images, and a plurality of levels of sub-images of the first image are in a one-to-one correspondence with a plurality of levels of sub-images of the second image. In this case, an implementation process of obtaining the specified parameter corresponding to the second to-be-matched feature point may include: obtaining, based on each level of sub-image of the first image and the corresponding level of sub-image of the second image, a specified parameter component of the corresponding level; and determining, as the specified parameter, a sum of specified parameter components corresponding to the plurality of levels of sub-images. The specified parameter component of the corresponding level is used to indicate a difference between image information represented by the first to-be-matched feature point and the second to-be-matched feature point in the corresponding level of sub-images.

As shown in FIG. 7, an image pyramid of a frame of image is a series of image sets from a same original image that are arranged in a pyramid shape and whose resolutions gradually decrease. The image pyramid is obtained by performing gradient image downsampling, and the gradient downsampling process ends when a preset termination condition is satisfied. In the image pyramid, a higher level of an image indicates a smaller size of the image, and correspondingly indicates a lower resolution. Optionally, the image pyramid may be a Laplacian pyramid, a Gaussian pyramid, or the like.

The images are represented by using the image pyramids, so that pixel grayscale differences and descriptor similarities of the two to-be-matched feature points can be separately calculated in case of a plurality of resolutions by using characteristics of the image pyramids. In this way, accuracy of the specified parameter and matching precision can further be improved. In addition, when feature point matching is performed based on the specified parameter obtained through calculation by using the image pyramids, matching precision and stability can be ensured. The matching precision is represented by an absolute value of a matching error, and when the absolute value of the matching error is smaller, the matching precision is higher. The matching stability is represented by a probability of incorrect matching, and when the probability of incorrect matching is lower, the matching stability is better. For example, it is assumed that a key-frame image Fa includes feature points a1, a2, a3, . . ., and an, a first to-be-matched feature point A is any one of the plurality of feature points, and an image block in which the first to-be-matched feature point A is located is Pa; a key-frame image Fb includes feature points b1, b2, b3, . . . , and bn, a second to-be-matched feature point B is any one of the plurality of feature points, and an image block in which the second to-be-matched feature point B is located is Pb; and sizes of both the image block Pa and the image block Pb are J, and both of the key-frame image Fa and the key-frame image Fb are represented by an image pyramid including levels 0, 1, . . . , and L. In this case, a pixel grayscale difference e1 and a descriptor similarity e2 that are corresponding to the second to-be-matched feature point B respectively satisfy:

$$e1 = \sum_{l=0}^{L}\sum_{j=0}^{J} I(P_1 \cdot S_l + D \cdot P_j) - a \times I(P_2 \cdot S_l + D \cdot P_j) - b; \text{ and}$$

$$e2 = \sum_{l=0}^{L} f(P1, P2, 1).$$

"·" represents a point multiplication operation, $S_l$ is a pyramid-level scaling coefficient, $S_l=0.5^l$, a and b are fixed deviations of the key-frame image Fa and the key-frame image Fb, P1 is image coordinates of a pixel in the first to-be-matched feature point A, and P2 is image coordinates of a pixel in the second to-be-matched feature point B. Pj is offset coordinates of a pixel in an image block, D is a location mapping relationship of the image block relative to a key-frame image to which the image block belongs, and the mapping relationship is used to indicate a relative location of the image block in the key-frame image. (P+DPj) is coordinates, in the key-frame image, of the pixel Pj in the image block, and I(x) is a pixel value of a pixel at coordinates x. f(x) is a function for indicating a similarity between pixels. Optionally, the function may be a Euclidean distance function, an amplitude function, a phase function, or the like.

It should be noted that, for ease of description, in the formulas corresponding to the pixel grayscale difference e1 and the descriptor similarity e2, only an example in which a feature point includes one pixel is used for description. When a feature point includes a plurality of pixels, a pixel grayscale difference corresponding to each pixel in the feature point may be calculated by referring to the formula corresponding to the pixel grayscale difference e1, and a sum of the pixel grayscale differences calculated based on all the pixels is determined as a pixel grayscale difference of the feature point. Similarly, when a feature point includes a plurality of pixels, a descriptor similarity corresponding to each pixel in the feature point may be calculated by referring to the formula corresponding to the descriptor similarity e2, and a sum of the descriptor similarities calculated based on all the pixels is determined as a descriptor similarity of the feature point.

Step 2032a. Determine, as a feature point that matches the first to-be-matched feature point, a second to-be-matched feature point corresponding to a smallest specified parameter.

When a specified parameter corresponding to a second to-be-matched feature point in the second image is smallest, it indicates that a difference between image information represented by the first to-be-matched feature point and the second to-be-matched feature point is smallest. In this case, the second to-be-matched feature point may be determined as a feature point that matches the first to-be-matched feature point. The plurality of feature points included in the second image are searched for the optimal matching feature point of the first to-be-matched feature point, and a matching relationship between the first to-be-matched feature point and the corresponding optimal matching feature point is established. In this way, stability and accuracy of feature point matching can be improved.

Optionally, to ensure matching accuracy of the first to-be-matched feature point and the second to-be-matched feature point, before the second to-be-matched feature point corresponding to the smallest specified parameter is determined as a feature point that matches the first to-be-matched feature point, the second to-be-matched feature point may further be verified. When the second to-be-matched feature point succeeds in verification, the second to-be-matched feature point is determined as a feature point that matches the first to-be-matched feature point.

For example, before the second to-be-matched feature point corresponding to the smallest specified parameter is determined as a feature point that matches the first to-be-matched feature point, the smallest specified parameter may be compared with a preset parameter threshold; and when the smallest specified parameter is less than the preset parameter threshold, the second to-be-matched feature point corresponding to the smallest specified parameter is determined as a feature point that matches the first to-be-matched feature point; and/or the smallest specified parameter may be compared with a second smallest specified parameter; and when a difference between the second smallest specified parameter and the smallest specified parameter is greater than a preset difference value, the second to-be-matched feature point corresponding to the smallest specified parameter is determined as a feature point that matches the first to-be-matched feature point, wherein the preset parameter threshold and the p reset difference value may be determined depending on an actual requirement; and/or a specified parameter corresponding to each first to-be-matched feature point may be obtained based on a pixel value of the second to-be-matched feature point corresponding to the smallest specified parameter and a pixel value of each first to-be-matched feature point in the first image; whether the first to-be-matched feature point corresponding to the smallest specified parameter and "the any first to-be-matched feature point" in step 2031a are a same feature point is determined; and when the two feature points are a same feature point, the second to-be-matched feature point corresponding to the smallest specified parameter is determined as a feature point that matches the first to-be-matched feature point.

In another implementation of performing feature point matching on the feature points in the two frames of images, for a first to-be-matched feature point in a first image and a second to-be-matched feature point in a second image, when a difference between image information represented by the two to-be-matched feature points is small enough to satisfy a preset requirement, it is determined that the first to-be-matched feature point matches the second to-be-matched feature point. As shown in FIG. 8, the implementation process may include the following steps.

Step 2031b. Obtain, based on a pixel value of any first to-be-matched feature point in the first image and a pixel value of any second to-be-matched feature point in the second image, a specified parameter corresponding to the second to-be-matched feature point.

Step 2032b. When the specified parameter is less than a first preset threshold, determine that the first to-be-matched feature point matches the second to-be-matched feature point, to obtain a feature point pair including the first to-be-matched feature point and the second to-be-matched feature point.

For an implementation process of step 2031b and step 2032b, correspondingly refer to the implementation process of step 2031a and step 2032a. Details are not described herein again.

Step 204. The terminal sends the map layer and the relative displacement between the capture locations of the every two frames of images to a server.

The terminal may send, through a communication connection to the server, related information of the first image, related information of the second image, the relative displacement, and the map layer including the plurality of feature points to the server. The related information of the image may include information such as information about a pixel in the image, information about a feature point in the image, and a motion parameter of the image capture component during capture of the corresponding image.

It should be noted that, if a screening operation has been performed on a plurality of frames of obtained original images in step 201, all the plurality of frames of images in step 202 to step 204 are key-frame images determined based on the screening operation. If no screening operation has been performed on the plurality of frames of obtained original images in step 201, the plurality of frames of images in step 202 to step 204 are the plurality of frames of obtained original images.

Step 205. The server performs feature point matching on feature points at two map layers to obtain a plurality of feature point pairs.

Each feature point pair includes two feature points that are respectively from the two map layers and that match each other. For example, each feature point pair includes two feature points that are respectively from a first map layer and a second map layer and that match each other. Optionally, there may be a plurality of implementations of performing feature point matching on a feature point at the first map layer and a feature point at the second map layer to obtain a feature point pair. In this embodiment of this application, the following two implementations are used as examples for description.

In an implementation, for any first to-be-matched feature point at the first map layer, a plurality of feature points included at the second map layer may be searched for an optimal matching feature point of the first to-be-matched feature point. As shown in FIG. 9, an implementation process of searching for the optimal matching feature point may include the following steps.

Step 2051a. Obtain, based on both a pixel value of the any first to-be-matched feature point at the first map layer and a pixel value of each second to-be-matched feature point at the second map layer, a specified parameter corresponding to the second to-be-matched feature point.

For an implementation process of step 2051a, correspondingly refer to the implementation process of step 2031a.

Step 2052a. Determine, as a feature point that matches the first to-be-matched feature point, a second to-be-matched feature point corresponding to a smallest specified parameter.

When a specified parameter corresponding to a second to-be-matched feature point at the second map layer is smallest, it indicates that a difference between image information represented by the first to-be-matched feature point and the second to-be-matched feature point is smallest. In this case, the second to-be-matched feature point may be determined as a feature point that matches the first to-be-matched feature point. The plurality of feature points included at the second map layer are searched for the optimal matching feature point of the first to-be-matched feature point, and a matching relationship between the first to-be-matched feature point and the corresponding optimal matching feature point is established. In this way, stability and accuracy of feature point matching can be improved.

Optionally, to ensure matching accuracy of the first to-be-matched feature point and the second to-be-matched feature point, before the second to-be-matched feature point corresponding to the smallest specified parameter is determined as a feature point that matches the first to-be-matched feature point, the second to-be-matched feature point may further be verified. When the second to-be-matched feature point succeeds in verification, the second to-be-matched feature point is determined as a feature point that matches the first to-be-matched feature point. For example, before the second to-be-matched feature point corresponding to the smallest specified parameter is determined as a feature point that matches the first to-be-matched feature point, the smallest specified parameter may be compared with a preset parameter threshold; and when the smallest specified parameter is less than the preset parameter threshold, and the second to-be-matched feature point corresponding to the smallest specified parameter is determined as a feature point that matches the first to-be-matched feature point; and/or the smallest specified parameter may be compared with a second smallest specified parameter; and when a difference between the second smallest specified parameter and the smallest specified parameter is greater than a preset difference value, the second to-be-matched feature point corresponding to the smallest specified parameter is determined as a feature point that matches the first to-be-matched feature point, wherein the preset parameter threshold and the preset difference value may be determined depending on an actual requirement; and/or a specified parameter corresponding to each first to-be-matched feature point may be obtained based on a pixel value of the second to-be-matched feature point corresponding to the smallest specified parameter and a pixel value of each first to-be-matched feature point in the first image; whether the first to-be-matched feature point corresponding to the smallest specified parameter and "the any first to-be-matched feature point" in step 2051a are a same feature point is determined; and when the two feature points are a same feature point, the second to-be-matched feature point corresponding to the smallest specified parameter is determined as a feature point that matches the first to-be-matched feature point.

Figure 10:
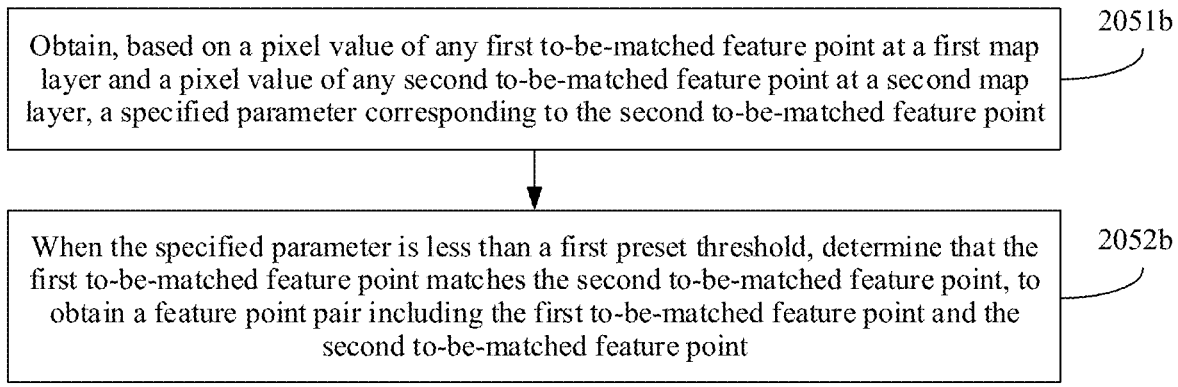
FIG. 10 is a flowchart of a method for performing feature point matching on a first to-be-matched feature point and a second to-be-matched feature point during feature point matching on a feature point at a first map layer and a feature point at a second map layer according to an embodiment of this application.

In another implementation, for a first to-be-matched feature point at a first map layer and a second to-be-matched feature point at a second map layer, when a difference between image information represented by the two to-be-matched feature points is small enough to satisfy a preset requirement, that is, it is determined that the first to-be-matched feature point matches the second to-be-matched feature point. As shown in FIG. 10, the implementation process may include the following steps.

Step 2051*b*. Obtain, based on a pixel value of any first to-be-matched feature point at the first map layer and a pixel value of any second to-be-matched feature point at the second map layer, a specified parameter corresponding to the second to-be-matched feature point.

Step 2052*b*. When the specified parameter is less than a first preset threshold, determine that the first to-be-matched feature point matches the second to-be-matched feature point, to obtain a feature point pair including the first to-be-matched feature point and the second to-be-matched feature point.

For an implementation process of step 2051*b* and step 2052*b*, correspondingly refer to the implementation process of step 2051*a* and step 2052*a*. Details are not described herein again. Step 206. The server obtains map layer space coordinates, at a corresponding map layer, of a feature point in each feature point pair, and obtains a target displacement relationship between the two map layers based on the map layer space coordinates, at the corresponding map layer, of the feature point in each feature point pair.

Optionally, map layer space coordinates, at a map layer, of a feature point may be solved by using a geometrical relationship based on image coordinates of the feature point in a target image corresponding to the map layer and the relative displacement between the capture locations of the every two frames of images in the plurality of frames of target images. The map layer space coordinates, at the corresponding map layer, of the feature point may be space coordinates determined based on a coordinate system established by using a specified point (for example, an anchor point) at the map layer as an origin. In addition, the relative displacement between the capture locations of the two frames of images is obtained based on the motion parameter of the image capture component at the corresponding image capture locations. The motion parameter is used to indicate a motion status of the image capture component.

Figure 11:
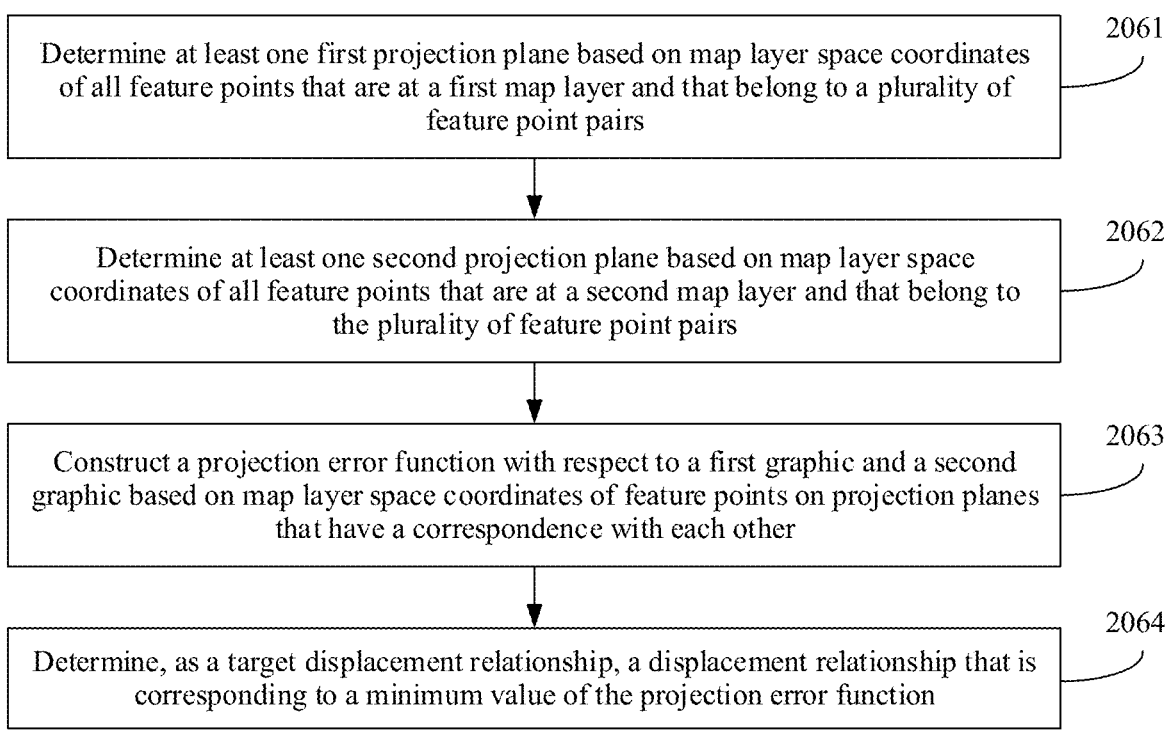
FIG. 11 is a flowchart of a method for obtaining a target displacement relationship between two map layers based on map layer space coordinates, at a corresponding map layer, of each feature point in each feature point pair according to an embodiment of this application.

Optionally, as shown in FIG. 11, an implementation process of obtaining the target displacement relationship between the two map layers based on the map layer space coordinates, at the corresponding map layer, of each feature point in each feature point pair may include the following steps.

Step 2061. Determine at least one first projection plane based on map layer space coordinates of all feature points that are at the first map layer and that belong to the plurality of feature point pairs.

Figure 12:
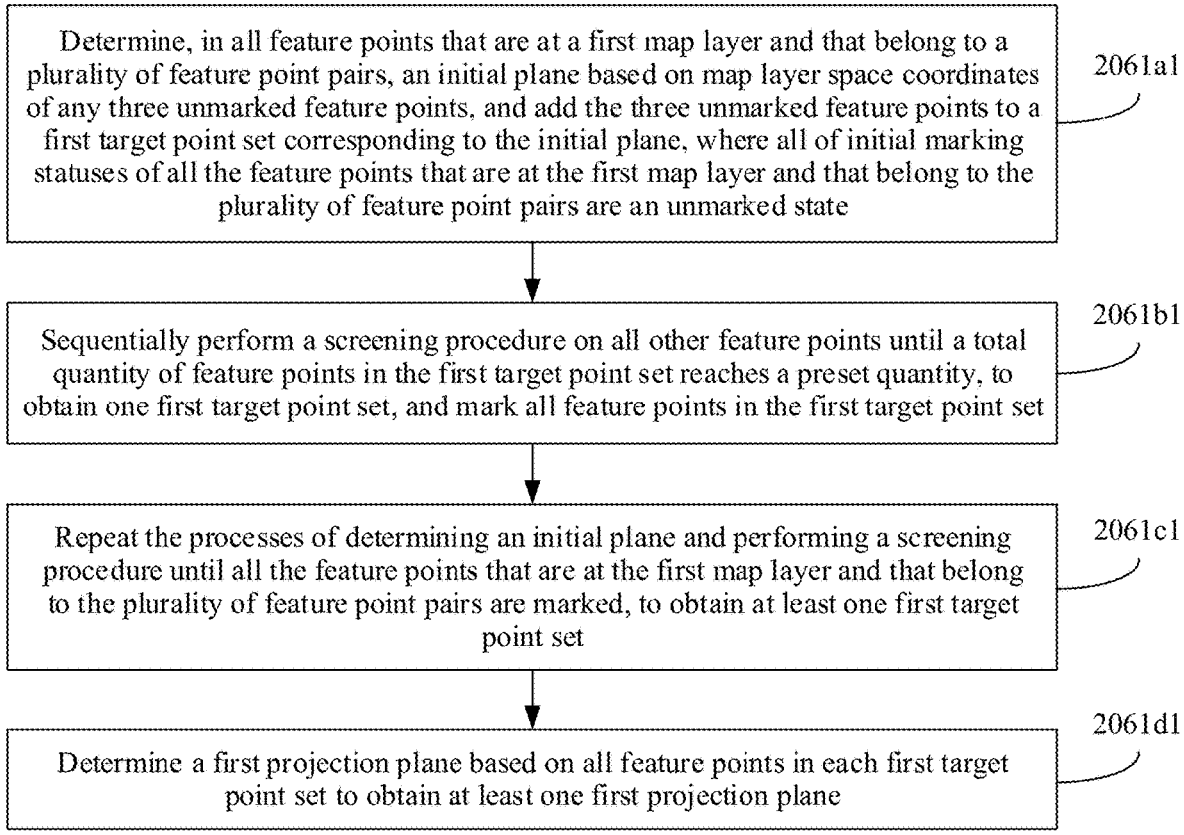
FIG. 12 is a flowchart of a method for determining at least one first projection plane based on map layer space coordinates of all feature points that are at a first map layer and that belong to a plurality of feature point pairs according to an embodiment of this application.

Optionally, as shown in FIG. 12, an implementation process of step 2061 may include the following steps.

Step 2061*a*1. Determine, in all the feature points that are at the first map layer and that belong to the plurality of feature point pairs, an initial plane based on map layer space coordinates of any three unmarked feature points, and add the three unmarked feature points to a first target point set corresponding to the initial plane, wherein all the feature points that are at the first map layer and that belong to the plurality of feature point pairs are initially in an unmarked state.

According to a principle that three points are coplanar, a plane can be determined by using any three points. Therefore, in step 2061*a*1, the initial plane may be determined in all the feature points that are at the first map layer and that belong to the plurality of feature point pairs, based on the map layer space coordinates of the any three unmarked feature points; and the first target point set is created based on the initial plane, wherein the created first target point set is an empty set.

Step 2061*b*1. Sequentially perform a screening procedure on all other feature points until a total quantity of feature points in the first target point set reaches a preset quantity, to obtain one first target point set, and mark all feature points in the first target point set.

The other feature points are feature points in all the unmarked feature points except the three unmarked feature points. When the total quantity of the feature points in the first target point set reaches the preset quantity, it may be determined that a plane determined based on all the feature points in the first target point set is an effective plane, wherein a confidence level of the plane is relatively high; and a displacement relationship between the first map layer and the second map layer may be determined based on the effective plane. In addition, the preset quantity may be determined depending on an actual requirement. For example, the preset quantity may be 10.

Figure 13:
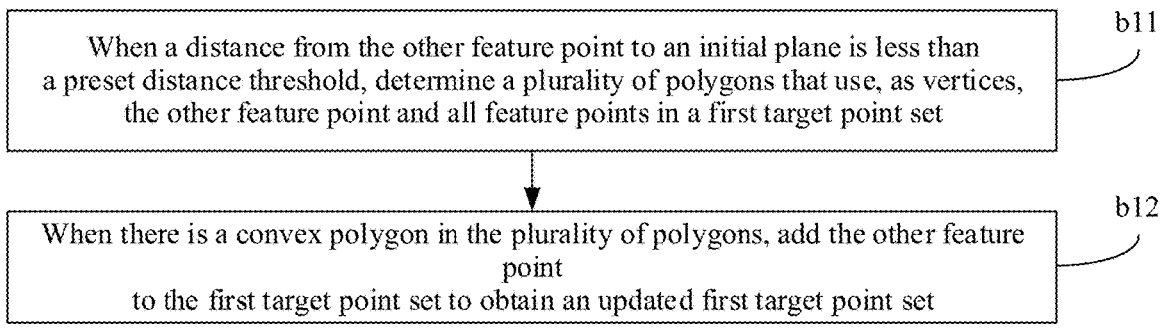
FIG. 13 is a method flowchart of a screening procedure according to an embodiment of this application.

Optionally, as shown in FIG. 13, for each other feature point, the screening procedure may include the following steps.

Step b11. When a distance from the other feature point to the initial plane is less than a preset distance threshold, determine a plurality of polygons that use, as vertices, the other feature point and all the feature points in the first target point set.

For each other feature point, the distance from the other feature point to the initial plane may be calculated. When the distance from the other feature point to the initial plane is less than the preset distance threshold, it may be determined that the other feature point is located on the initial plane within an allowed error range. In this case, the plurality of polygons that use, as vertices, the other feature point and all the feature points in the first target point set may be determined based on the other feature point and all the feature points in the first target point set. In addition, whether a corresponding feature point is an effective feature point on the initial plane is determined based on shapes of the plurality of polygons, that is, step b12 is performed.

Step b12. When there is a convex polygon in the plurality of polygons, add the other feature point to the first target point set to obtain an updated first target point set.

When there is a convex polygon in the plurality of polygons, it may be determined that the other feature point is an effective feature point on the initial plane. Because the plurality of polygons can be determined by using, as vertices, the other feature point and all the feature points in the first target point set, and the convex polygon is in minority in the plurality of polygons, it is determined that a feature point in the convex polygon is an effective feature point on the corresponding plane, and the displacement relationship between the first map layer and the second map layer may be determined based on map layer space coordinates of the other feature point. Therefore, when there is a convex polygon in the plurality of polygons, the other feature point may be added to the first target point set, to update the first target point set. In addition, the first target point set is determined based on the convex polygon, so as to reduce computation complexity and improve calculation precision and stability. For a polygon, any side of the polygon is infinitely extended to both sides of the polygon to obtain a straight line. If all other sides of the polygon are on a same side of the straight line, the polygon is a convex polygon.

It should be noted that, in implementation processes of step b11 and step b12, when the distance from the other feature point to the initial plane is less than the preset distance threshold, the other feature point may alternatively be connected to each of any two feature points in the first target point set may alternatively be performed; and when an interior angle formed by the two feature points and the other feature point is less than 180 degrees, after it is determined that there is a convex polygon in the polygons that use, as vertices, the other feature point and all the feature points in the first target point set, the other feature point may be added to the first target point set, to update the first target point set.

For example, as shown in FIG. 14, it is assumed that a first target point set includes a point X1, a point X2, and a point X3. When a distance from another feature point X4 to an initial plane determined by the point X1, the point X2, and the point X3 is less than a preset distance threshold, the another feature point X4 may be connected to both the point X2 and the point X3. An interior angle formed by the another feature point X4, the point X2, and the point X3 is an angle θ. It can be learned based on FIG. 14 that the angle θ is less than 180 degrees. In this case, it may be determined that there is a convex polygon in polygons that use the point X1, the point X2, the point X3, and the another feature point X4 as vertices, and the another feature point X4 may be added to the first target point set to obtain an updated first target point set including the point X1, the point X2, the point X3, and the another feature point X4.

Step 2061*c*1. Repeat the processes of determining an initial plane and performing a screening procedure until all the feature points that are at the first map layer and that belong to the plurality of feature point pairs are marked, to obtain at least one first target point set.

Step 2061*d*1. Determine a first projection plane based on all feature points in each first target point set to obtain the at least one first projection plane.

The plane can be determined by using all the feature points in each first target point set, and the plane is the first projection plane determined based on all the feature points in the first target point set. After step 2061*a*1 to step 2061*c*1 are performed, the at least one first target point set may be obtained. In this case, a first projection plane may be determined based on each of the at least one first target point set, to obtain the at least one first projection plane.

Step 2062. Determine at least one second projection plane based on map layer space coordinates of all feature points that are at the second map layer and that belong to the plurality of feature point pairs.

The at least one first projection plane is in a one-to-one correspondence with the at least one second projection plane, and a plurality of feature points for determining each first projection plane and a plurality of feature points for determining a corresponding second projection plane are feature points that match in a one-to-one manner.

In a first implementation of step 2062, referring to the implementation process of step 2061, an initial plane may be determined based on map layer space coordinates of feature points, and a screening procedure may be performed to obtain the at least one second projection plane.

In a second implementation of step 2062, because all the feature points that are at the second map layer and that belong to the plurality of feature point match, in a one-to-one manner, all the feature points that are at the first map layer and that belong to the plurality of feature point pairs, after the at least one first projection plane is determined based on all the feature points that are at the first map layer and that belong to the plurality of feature point pairs, a second projection plane may be determined based on feature points that match the feature points on each first projection plane, so as to obtain the at least one second projection plane. As shown in FIG. 15, the implementation process may include the following steps.

Step 2062*a*2. Determine, in all feature points at the second map layer, a second target point set based on each first projection plane, wherein each second target point set includes a plurality of feature points that match a plurality of feature points on the first projection plane in a one-to-one manner.

For each first projection plane, the plurality of feature points included on the first projection plane may be determined, and the plurality of feature points that match, in a one-to-one manner, the plurality of feature points included on the first projection plane may be determined in the plurality of feature points at the second map layer based on a one-to-one matching relationship between the feature points at the first map layer and the feature points at the second map layer, to obtain a second target point set. Correspondingly, the at least one second target point set may be determined based on the at least one first projection plane.

Step 2062*b*2. Determine, as a second projection plane corresponding to the corresponding first projection plane, a plane on which the plurality of feature points included in each second target point set are located, to obtain the at least one second projection plane.

A second projection plane may be determined based on the plurality of feature points included in each second target point set, and correspondingly, the at least one second projection plane may be obtained based on at least one target feature.

Step 2063. Construct a projection error function with respect to a first graphic and a second graphic based on map layer space coordinates of feature points on projection planes that have a correspondence with each other.

Figure 16:
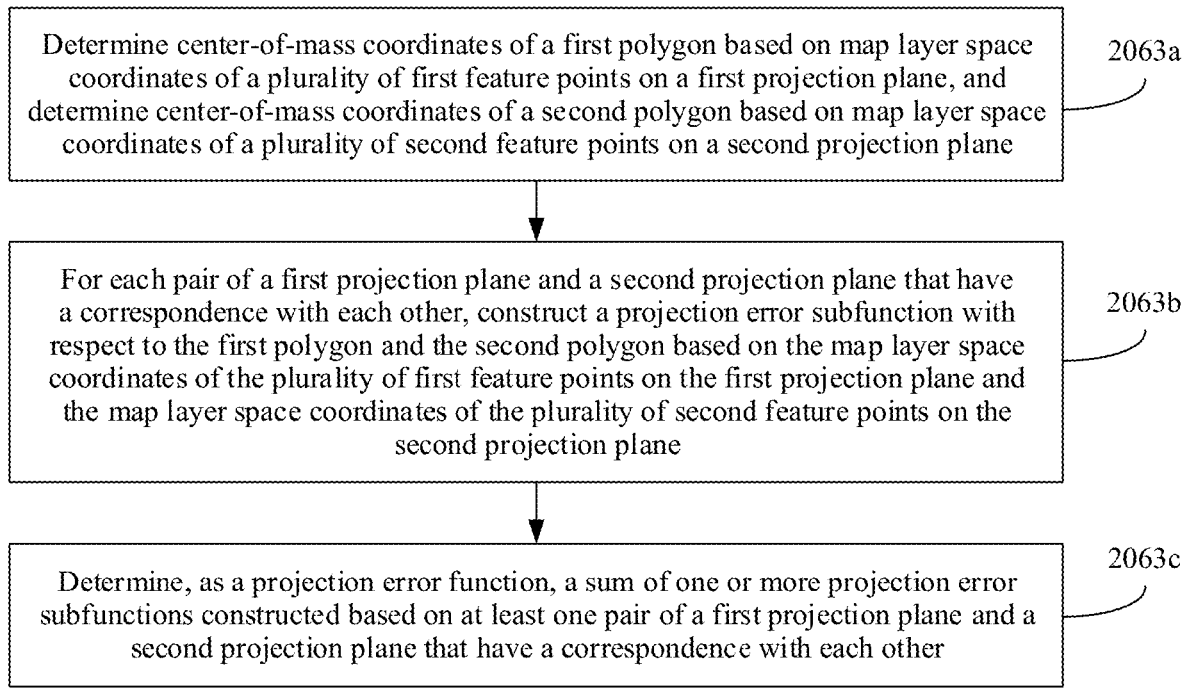
FIG. 16 is a flowchart of a method for constructing a projection error function with respect to a first graphic and a second graphic based on map layer space coordinates, at a corresponding map layer, of feature points on projection planes that have a correspondence with each other according to an embodiment of this application.

The projection error function is used to represent a relationship that a projection error between the first graphic and the second graphic varies with a displacement relationship between the first map layer and the second map layer, the first graphic is a graphic that uses, as vertices, all the feature points that are at the first map layer and that belong to the plurality of feature point pairs, and the second graphic is a graphic that uses, as vertices, all the feature points that are at the second map layer and that belong to the plurality of feature point pairs. Optionally, as shown in FIG. 16, an implementation process of step 2063 may include the following steps.

Step 2063*a*. Determine center-of-mass coordinates of a first polygon based on map layer space coordinates of a plurality of first feature points on the first projection plane, and determine center-of-mass coordinates of a second polygon based on map layer space coordinates of a plurality of second feature points on the second projection plane.

The first polygon is a polygon with a largest area among polygons obtained by connecting the plurality of first feature points, and the second polygon is a polygon with a largest area among polygons obtained by connecting the plurality of second feature points.

Optionally, for the plurality of first feature points on the first projection plane, the center-of-mass coordinates of the first polygon obtained by connecting the plurality of first feature points satisfy $Xm = \Sigma m_i \times x_i / \Sigma m_i$, wherein Xi is map layer space coordinates of the first feature point, mi is a weight of the corresponding first feature point, wherein i is a positive integer. A weight corresponding to each first feature point may be determined depending on an actual requirement. For example, the weight m corresponding to each feature point may be 1. For a manner of calculating the center-of-mass coordinates of the second polygon, correspondingly refer to the manner of calculating the center-of-mass coordinates of the first polygon.

Step 2063b. For each pair of a first projection plane and a second projection plane that have a correspondence with each other, construct a projection error subfunction with respect to the first polygon and the second polygon based on the map layer space coordinates of the plurality of first feature points on the first projection plane and the map layer space coordinates of the plurality of second feature points on the second projection plane.

The projection error subfunction is used to represent a relationship that a projection error between the first polygon and the second polygon varies with the displacement relationship between the first map layer and the second map layer. The displacement relationship may include a rotation relationship and a translation relationship.

During construction of the projection error subfunction with respect to the first polygon and the second polygon, the projection error subfunction may be constructed based on the map layer space coordinates of the plurality of first feature points, the map layer space coordinates of the plurality of second feature points, the center-of-mass coordinates of the first polygon, and the center-of-mass coordinates of the second polygon. In addition, when the projection subfunction is constructed based on the center-of-mass coordinates, accuracy of a displacement relationship determined based on the projection subfunction can be improved.

Optionally, map layer space coordinates $S_{ri}$ of a first feature point i, map layer space coordinates $S_{li}$ of a second feature point i, the center-of-mass coordinates Xr of the first polygon, the center-of-mass coordinates Xl of the second polygon, the projection error subfunction E, the rotation relationship R, and the translation relationship T may satisfy the following:

$$E = \sum_{i=0}^{n}\left[\|S_{ri} - [R \cdot S_{li} + T]\|^2 + \|Xr - [R \cdot Xl + T]\|^2\right],$$

where

"·" represents a point multiplication operation, n is a total quantity of the first feature points on the first projection plane, and $\|\cdot\|$ is a norm operation. It should be noted that, in a process of determining a first displacement between the first map layer and the second map layer, step 2063a may alternatively not be performed. When step 2063a is not performed, the map layer space coordinates Sr of the first feature point, the map layer space coordinates Sl of the second feature point, the projection error subfunction E, the rotation relationship R, and the translation relationship T may satisfy the following:

$$E = \sum_{i=0}^{n}\left[\|S_{ri} - [R \cdot S_{li} + T]\|^2\right].$$

Step 2063c. Determine, as the projection error function, a sum of one or more projection error subfunctions constructed based on at least one pair of a first projection plane and a second projection plane that have a correspondence with each other.

After the corresponding projection error subfunction with respect to the first polygon and the second polygon is constructed based on each pair of a first projection plane and a second projection plane that have a correspondence with each other, the sum of the projection error subfunction corresponding to the at least one pair of a first projection plane and a second projection plane that have a correspondence with each other is determined as the projection error function, that is, the projection error function is $$E_{all} = \sum_{k=1}^{m} E_k,$$

wherein m is a total quantity of pairs of the first projection plane and the second projection plane that have a correspondence with each other.

Step 2064. Determine, as the target displacement relationship, a displacement relationship that is corresponding to a minimum value of the projection error function.

After the projection error function with respect to the first graphic and the second graphic is determined, the projection error function may be optimized by using an optimization algorithm to obtain a rotation relationship R and a translation relationship T that are corresponding to the minimum value of the projection error function, the rotation relationship R that is corresponding to the minimum value of the projection error function is determined as a rotation relationship in the target displacement relationship, and the translation relationship T that is corresponding to the minimum value of the projection error function is determined as a translation relationship in the target displacement relationship.

Because the first map layer and the second map layer each include a plurality of feature points, and map layer space coordinates of each feature point are 3D coordinates, if a target displacement relationship between the first map layer and the second map layer is directly obtained based on the map layer space coordinates of the feature point, an implementation process thereof is equivalent to a process of pose solution performed in 3D space. The process has relatively high computation complexity and relatively low calculation precision. In this embodiment of this application, the at least one first projection plane and the at least one second projection plane are determined, and the error function is constructed based on projection planes that have a correspondence with each other, to obtain the target displacement relationship. In this way, computation in 3D space can be converted into calculation on a plane, thereby reducing computation complexity and improving calculation precision and stability.

Step 207. The server performs map layer fusion on the every two map layers based on the target displacement relationship between the every two map layers, to obtain a map of the target environment.

After feature point matching is performed on the feature points at the every two map layers, an overlapping region at each map layer may be determined. In this case, based on the target displacement relationship between the every two map layers, coordinate transformation is performed on map layer space coordinates of all feature points at at least one map layer of the every two map layers, so that map layer space coordinates, obtained after the transformation, of all the feature points at the every two map layers are obtained based on a same reference coordinate system. In this case, a plurality of map layers may be expanded to same coordinates to obtain the map that includes feature points at the plurality of map layers, and map layer space coordinates of all the feature points in the map are all obtained based on a same reference. The reference coordinate system may be a coordinate system in which any one of the plurality of map layers is located, or the reference coordinate system may be another specified coordinate system. This is not limited in this embodiment of this application.

When a to-be-fused map layer is a map layer determined based on an image of a parking lot environment, a localization map layer of the parking lot environment can be obtained by using the map building method provided in this embodiment of this application. The parking lot localization map layer may be used to describe a current environment of a parking lot by using feature points, and coordinates of all the feature points in the parking lot localization map layer are all determined based on a same coordinate system. Therefore, a location of a to-be-positioned vehicle in the parking lot can be accurately determined by comparing a description of a current environment in which the to-be-positioned vehicle is located with the localization map layer. In this way, the to-be-positioned vehicle can be precisely positioned, thereby ensuring safe driving of the intelligent driving vehicle.

In conclusion, according to the map building methods provided in the embodiments of this application, feature point matching is performed on the feature points at the every two map layers; the target displacement relationship between the two map layers is obtained based on the map layer space coordinates, at the corresponding map layer, of each feature point in each feature point pair; and map layer fusion is performed on the every two map layers based on the target displacement relationship between the every two map layers. The map layer space coordinates of each feature point are obtained based on the image coordinates of the corresponding feature point in the target image and the relative displacement between the capture locations of the every two frames of target images, and the relative displacement is obtained based on the motion parameter of the image capture component at the image capture locations. Therefore, compared with a related technology, the map layer space coordinates of the feature point do not need to rely on location information, provided by a GPS, of the feature point in the image. This can avoid a problem that reliability of location information determined based on a GPS signal is relatively low because the GPS signal is affected, thereby effectively improving accuracy of the map obtained through map layer fusion.

In addition, because the map building method does not need to rely on the location information, provided by the GPS, of the feature points in the image, the method can be applied to a target environment in which there is no GPS signal or a GPS signal is relatively weak, so that the method is applied to a relatively wide range. For example, when the map building method is applied to a parking lot environment, a problem that reliability of location information determined based on a GPS signal is relatively low because the GPS signal in the parking lot environment is affected can be avoided, thereby improving accuracy and precision of an obtained parking lot localization map layer, and effectively ensuring safe driving of an intelligent driving vehicle.

It should be noted that a chronological order of steps of the map building methods provided in the embodiments of the present application may be properly adjusted, and the steps may also be correspondingly added or deleted according to a situation. Any variation readily figured out by persons skilled in the art within the technical scope disclosed in the present application shall fall within the protection scope of the present application, and details are not described herein again.

Figure 17:
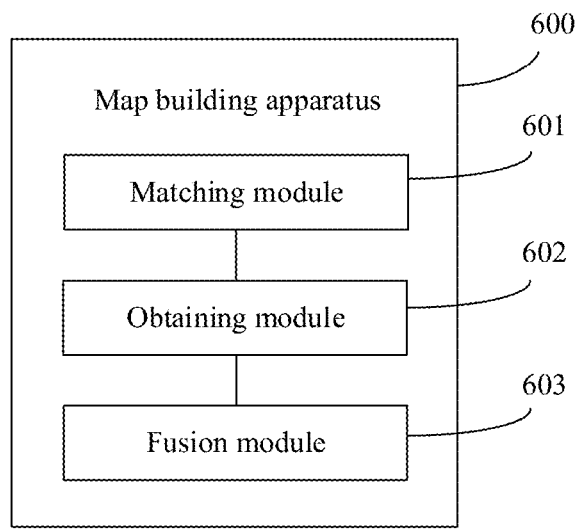
FIG. 17 is a schematic structural diagram of a map building apparatus according to an embodiment of this application.
Figure 18:
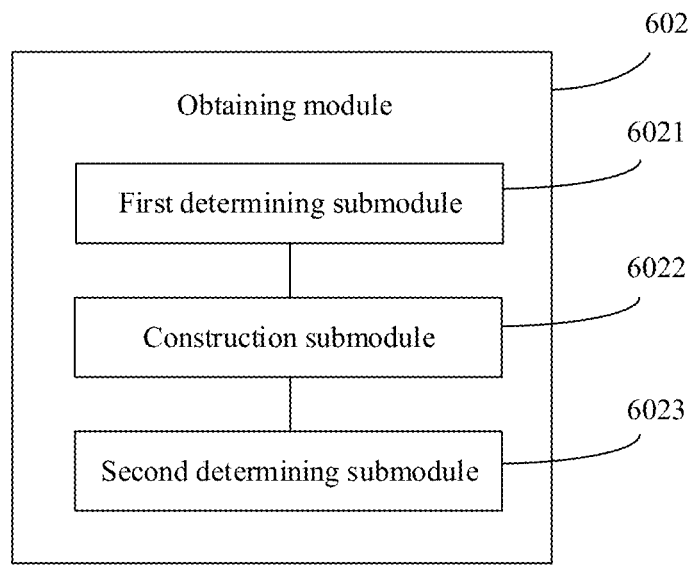
FIG. 18 is a schematic structural diagram of an obtaining module according to an embodiment of this application.

An embodiment of this application further provides a map building apparatus. As shown in FIG. 17, the apparatus 600 may include:

a matching module 601, configured to perform feature point matching on feature points at every two map layers of a plurality of map layers used to build a map, to obtain a plurality of feature point pairs, wherein each feature point pair includes two feature points that are respectively from the two map layers and that match each other, each map layer includes feature points in a plurality of frames of images, and each frame of image carries image information of a target environment;

an obtaining module 602, configured to obtain a target displacement relationship between the two map layers based on map layer space coordinates, at a corresponding map layer, of each feature point in each feature point pair, wherein the map layer space coordinates are obtained based on image coordinates of the feature point in a target image and a relative displacement between capture locations of every two frames of target images, the relative displacement is obtained based on a motion parameter of an image capture component at the image capture locations, the motion parameter is used to indicate a motion status of the image capture component, and the target image is an image in which the feature point is located; and a fusion module 603, configured to perform map layer fusion on the every two map layers based on the target displacement relationship between the every two map layers, to obtain a map of the target environment. Optionally, the two map layers may include a first map layer and a second map layer. As shown in FIG. 18, the obtaining module 602 may include:

a first determining submodule 6021, configured to determine at least one first projection plane based on map layer space coordinates of all feature points that are at the first map layer and that belong to the plurality of feature point pairs, where the first determining submodule 6021 is further configured to determine at least one second projection plane based on map layer space coordinates of all feature points that are at the second map layer and that belong to the plurality of feature point pairs, wherein the at least one first projection plane is in a one-to-one correspondence with the at least one second projection plane, and a plurality of feature points for determining each first projection plane and a plurality of feature points for determining a corresponding second projection plane are feature points that match in a one-to-one manner;

a construction submodule 6022, configured to construct a projection error function with respect to a first graphic and a second graphic based on map layer space coordinates of feature points on projection planes that have a correspondence with each other, wherein the projection error function is used to represent a relationship that a projection error between the first graphic and the second graphic varies with a displacement relationship between the two map layers, the first graphic is a graphic that uses, as vertices, all the feature points that are at the first map layer and that belong to the plurality of feature point pairs, and the second graphic is a graphic that uses, as vertices, all the feature points that are at the second map layer and that belong to the plurality of feature point pairs; and a second determining submodule 6023, configured to determine, as the target displacement relationship, a displacement relationship that is corresponding to a minimum value of the projection error function.

Optionally, the first determining submodule 6021 is configured to:

for each pair of a first projection plane and a second projection plane that have a correspondence with each other, construct a projection error subfunction with respect to a first polygon and a second polygon based on map layer space coordinates of a plurality of first feature points on the first projection plane and map layer space coordinates of a plurality of second feature points on the second projection plane, wherein the projection error subfunction is used to represent a relationship that a projection error between the first polygon and the second polygon varies with the displacement relationship, the first polygon is a polygon with a largest area among polygons obtained by connecting the plurality of first feature points, and the second polygon is a polygon with a largest area among polygons obtained by connecting the plurality of second feature points; and determine, as the projection error function, a sum of one or more projection error subfunctions constructed based on at least one pair of a first projection plane and a second projection plane that have a correspondence with each other.

Figure 19:
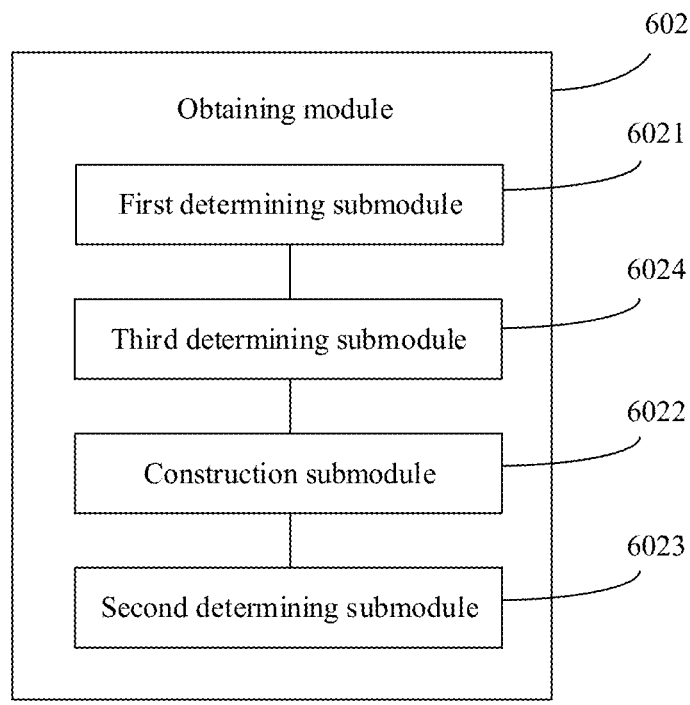
FIG. 19 is a schematic structural diagram of another obtaining module according to an embodiment of this application.

Optionally, as shown in FIG. 19, the obtaining module 602 may further include:

a third determining submodule 6024, configured to determine center-of-mass coordinates of the first polygon based on the map layer space coordinates of the plurality of first feature points, where the third determining submodule 6024 is further configured to determine center-of-mass coordinates of the second polygon based on the map layer space coordinates of the plurality of second feature points.

Correspondingly, the first determining submodule 6021 is configured to construct the projection error subfunction based on the map layer space coordinates of the plurality of first feature points, the map layer space coordinates of the plurality of second feature points, the center-of-mass coordinates of the first polygon, and the center-of-mass coordinates of the second polygon.

Optionally, the displacement relationship may include a rotation relationship and a translation relationship; and map layer space coordinates Sr of a first feature point, map layer space coordinates Sl of a second feature point, the center-of-mass coordinates Xr of the first polygon, the center-of-mass coordinates Xl of the second polygon, the projection error subfunction E, the rotation relationship R, and the translation relationship T may satisfy the following:

$$E = \sum_{i=0}^{n}\left[\|S_{ri} - [R \cdot S_{li} + T]\|^2 + \|Xr - [R \cdot Xl + T]\|^2\right],$$

where n is a total quantity of the first feature points on the first projection plane, and $\|\cdot\|$ is a norm operation. Optionally, the first determining submodule 6021 is configured to: determine, in all the feature points that are at the first map layer and that belong to the plurality of feature point pairs, an initial plane based on map layer space coordinates of any three unmarked feature points, and add the three unmarked feature points to a first target point set corresponding to the initial plane, wherein all the feature points that are at the first map layer and that belong to the plurality of feature point pairs are initially in an unmarked state;

sequentially perform a screening procedure on all other feature points until a total quantity of feature points in the first target point set reaches a preset quantity, to obtain one first target point set, and mark all feature points in the first target point set, wherein the other feature points are feature points in all the unmarked feature points except the three unmarked feature points;

repeat the processes of determining an initial plane and performing a screening procedure until all the feature points that are at the first map layer and that belong to the plurality of feature point pairs are marked, to obtain at least one first target point set; and determine a first projection plane based on all feature points in each first target point set to obtain the at least one first projection plane.

For each of the other feature points, the screening procedure may include: when a distance from the feature point to the initial plane is less than a preset distance threshold, determining a plurality of polygons that use, as vertices, the feature point and all the feature points in the first target point set; and when there is a convex polygon in the plurality of polygons, adding the feature point to the first target point set to obtain an updated first target point set.

Optionally, the first determining submodule 6021 is configured to:

determine, in all feature points at the second map layer, a second target point set based on each first projection plane, wherein each second target point set may include a plurality of feature points that match a plurality of feature points on the first projection plane in a one-to-one manner; and determine, as a second projection plane corresponding to the corresponding first projection plane, a plane on which the plurality of feature points included in each second target point set are located, to obtain the at least one second projection plane.

Figure 20:
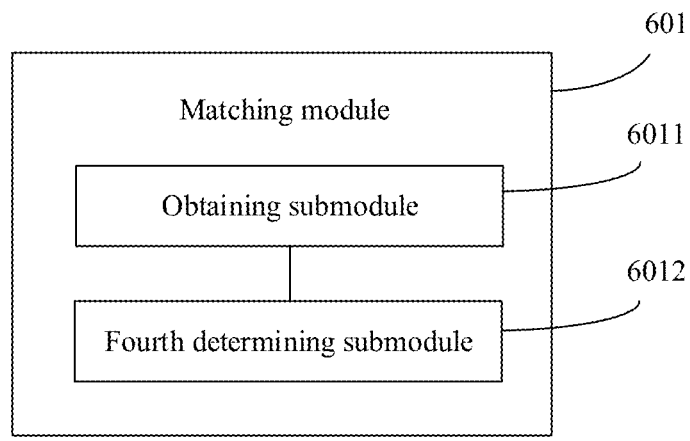
FIG. 20 is a schematic structural diagram of a matching module according to an embodiment of this application.

In an implementation, as shown in FIG. 20, the matching module 601 may include:

an obtaining submodule 6011, configured to obtain, based on both a pixel value of any first to-be-matched feature point in a first image and a pixel value of each second to-be-matched feature point in a second image, a specified parameter corresponding to the second to-be-matched feature point, wherein the specified parameter is used to indicate a difference between image information represented by the first to-be-matched feature point and the second to-be-matched feature point, the first image is any image in which the first to-be-matched feature point is located and that is in a plurality of frames of images corresponding to the first map layer, and the second image is any image in which the second to-be-matched feature point is located and that is in a plurality of frames of images corresponding to the second map layer; and a fourth determining submodule 6012, configured to determine, as a feature point that matches the first to-be-matched feature point, a second to-be-matched feature point corresponding to a smallest specified parameter.

In another implementation, still referring to FIG. 20, the matching module 601 may include:

an obtaining submodule 6011, configured to obtain, based on a pixel value of any first to-be-matched feature point in a first image and a pixel value of any second to-be-matched feature point in a second image, a specified parameter corresponding to the second to-be-matched feature point, wherein the specified parameter is used to indicate a difference between image information represented by the first to-be-matched feature point and the second to-be-matched feature point, the first image is any image in which the first to-be-matched feature point is located and that is in a plurality of frames of images corresponding to the first map layer, and the second image is any image in which the second to-be-matched feature point is located and that is in a plurality of frames of images corresponding to the second map layer; and a fourth determining submodule 6012, configured to: when the specified parameter is less than a first preset threshold, determine that the first to-be-matched feature point matches the second to-be-matched feature point.

Optionally, the obtaining submodule 6011 is configured to obtain the specified parameter based on a pixel value of each pixel in a first image block and a pixel value of each pixel in a second image block, wherein the first image block includes a pixel corresponding to the first to-be-matched feature point, the second image block includes a pixel corresponding to the second to-be-matched feature point, and a size of the second image block is equal to a size of the first image block.

Optionally, both of the first image and the second image are represented by an image pyramid including a plurality of levels of sub-images, and a plurality of levels of sub-images of the first image are in a one-to-one correspondence with a plurality of levels of sub-images of the second image; and correspondingly, the obtaining submodule 6011 is configured to:

obtain, based on each level of sub-image of the first image and the corresponding level of sub-image of the second image, a specified parameter component of a corresponding level; and determine, as the specified parameter, a sum of specified parameter components corresponding to the plurality of levels of sub-images.

Optionally, the specified parameter may include a pixel grayscale difference and/or a descriptor similarity.

Optionally, the fusion module 603 is configured to: for at least one of the two map layers, perform coordinate transformation on map layer space coordinates of all feature points at the map layer, so that map layer space coordinates of all feature points on the map that includes feature points at the plurality of map layers are obtained based on a same reference coordinate system.

Optionally, the target environment is a parking lot environment.

In conclusion, according to the map building apparatus provided in this embodiment of this application, the matching module performs feature point matching on the feature points at the every two map layers; the obtaining module obtains the target displacement relationship between the two map layers based on the map layer space coordinates, at the corresponding map layer, of each feature point in each feature point pair; and the fusion module performs map layer fusion on the every two map layers based on the target displacement relationship between the every two map layers. The map layer space coordinates of each feature point are obtained based on the image coordinates of the corresponding feature point in the target image and the relative displacement between the capture locations of the every two frames of target images, and the relative displacement is obtained based on the motion parameter of the image capture component at the image capture locations. Therefore, compared with a related technology, the map layer space coordinates of the feature point do not need to rely on location information, provided by a GPS, of the feature point in the image. This can avoid a problem that reliability of location information determined based on a GPS signal is relatively low because the GPS signal is affected, thereby effectively improving accuracy of the map obtained through map layer fusion.

In addition, because the map building process does not need to rely on the location information, provided by the GPS, of the feature points in the image, the apparatus can be applied to a target environment in which there is no GPS signal or a GPS signal is relatively weak, so that the apparatus is applied to a relatively wide range. For example, when the map building apparatus is applied to a parking lot environment, a problem that reliability of location information determined based on a GPS signal is relatively low because the GPS signal in the parking lot environment is affected can be avoided, thereby improving accuracy and precision of an obtained parking lot localization map layer, and effectively ensuring safe driving of an intelligent driving vehicle.

Figure 21:
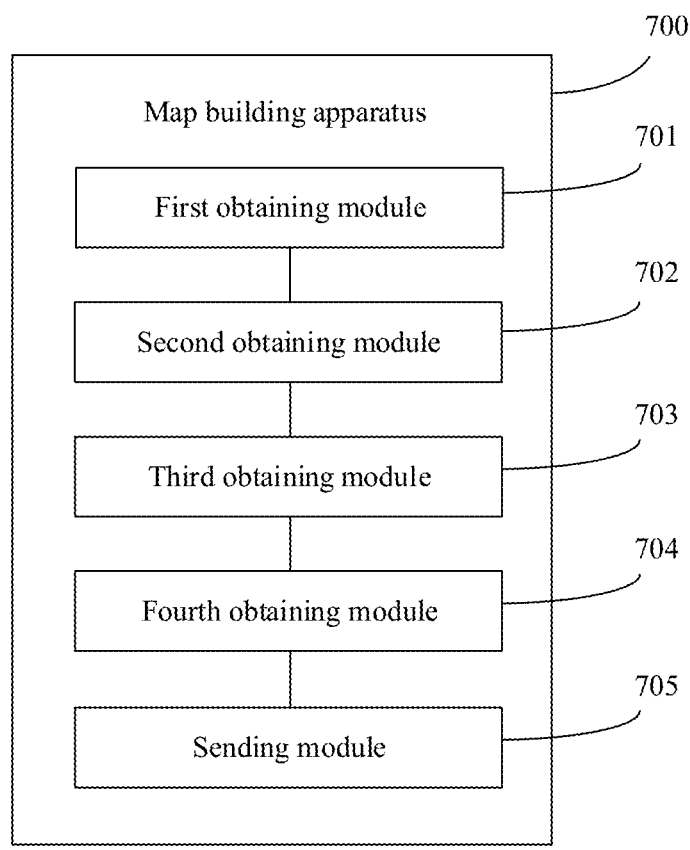
FIG. 21 is a schematic structural diagram of another map building apparatus according to an embodiment of this application.

An embodiment of this application further provides a map building apparatus. As shown in FIG. 21, the map building apparatus 700 may include:

a first obtaining module 701, configured to obtain a plurality of frames of images that carry image information of a target environment, wherein the plurality of frames of images are captured by an image capture component;

a second obtaining module 702, configured to obtain a motion parameter of the image capture component at a capture location of each frame of image, wherein the motion parameter is used to indicate a motion status of the image capture component;

a third obtaining module 703, configured to obtain a relative displacement between capture locations of every two frames of images based on the motion parameter of the image capture component;

a fourth obtaining module 704, configured to obtain, based on the plurality of frames of images and the relative displacement, a map layer including feature points in the plurality of frames of images, wherein the map layer is used to build a map; and a sending module 705, configured to send the map layer and the relative displacement to a server.

Optionally, the plurality of frames of images are all key-frame images that carry the image information of the target environment, and the first obtaining module 701 is configured to:

obtain a plurality of frames of to-be-screened images that carry the image information of the target environment;

obtain a target parameter of each frame of to-be-screened image, wherein the target parameter is used to indicate a variation of the to-be-screened image relative to a specified image; and when the target parameter of the to-be-screened image is greater than a second preset threshold, determine the to-be-screened image as a key-frame image.

Optionally, the target parameter may include one or more of the following:

a time interval between a capture time point of the to-be-screened image and a capture time point of the specified image;

an angle variation between an angle of view of the image capture component during capture of the to-be-screened image and an angle of view of the image capture component during capture of the specified image;

a relative displacement between a capture location of the to-be-screened image and a capture location of the specified image;

a first total quantity of feature points included in the to-be-screened image; and a first ratio of a second total quantity to the first total quantity, wherein the second total quantity is a total quantity of feature points that are in the feature points included in the to-be-screened image and that are different from feature points included in the specified image.

Optionally, the plurality of frames of images are adjacent in terms of time sequence, and the specified image corresponding to each frame of to-be-screened image is a frame of key-frame image that is in the plurality of frames of images and that is prior to and closest to the to-be-screened image in terms of time sequence. Optionally, the first obtaining module 701 is configured to:

determine a second ratio of the second total quantity to a third total quantity when the target parameter of the to-be-screened image is greater than the second preset threshold, wherein the third total quantity is a total quantity of feature points included in the to-be-screened image, and the second total quantity is a total quantity of feature points that are in the feature points included in the to-be-screened image and that are different from feature points included in the specified image; and when the second ratio is greater than a preset ratio, determine the to-be-screened image as the key-frame image.

In conclusion, according to the map building apparatus provided in this embodiment of this application, the first obtaining module obtains the plurality of frames of images that carry the image information of the target environment; the second obtaining module obtains the motion parameter of the image capture component at the capture location of each frame of image; the third obtaining module obtains the relative displacement between the capture locations of the every two frames of images based on the motion parameter; the fourth obtaining module obtains, based on the plurality of frames of images and the relative displacement, the map layer including the feature points in the plurality of frames of images; and the sending module sends the map layer and the relative displacement to the server. In this way, the server can obtain map layer space coordinates of a feature point based on image coordinates of the feature point in a target image and the relative displacement between the capture locations of the every two frames of target images, and the relative displacement is obtained based on the motion parameter of the image capture component at the image capture locations. Therefore, compared with a related technology, the map layer space coordinates of the feature point do not need to rely on location information, provided by a GPS, of the feature point in the image. This can avoid a problem that reliability of location information determined based on a GPS signal is relatively low because the GPS signal is affected, thereby effectively improving accuracy of the map obtained through map layer fusion.

It may be clearly understood by a person skilled in the art that, for the purpose of convenient and brief description, for a detailed working process of the foregoing system, apparatus module, and submodule, refer to a corresponding process in the foregoing method embodiments, and details are not described herein again.

An embodiment of this application further provides a map building apparatus. The map building apparatus may include a processor and a memory. The memory may store a computer program. When the processor executes the computer program stored in the memory, the map building apparatus can perform the map building methods provided in the embodiments of this application. For example, the map building apparatus is configured to perform step 205 to step 207 in the foregoing method embodiment.

Figure 22:
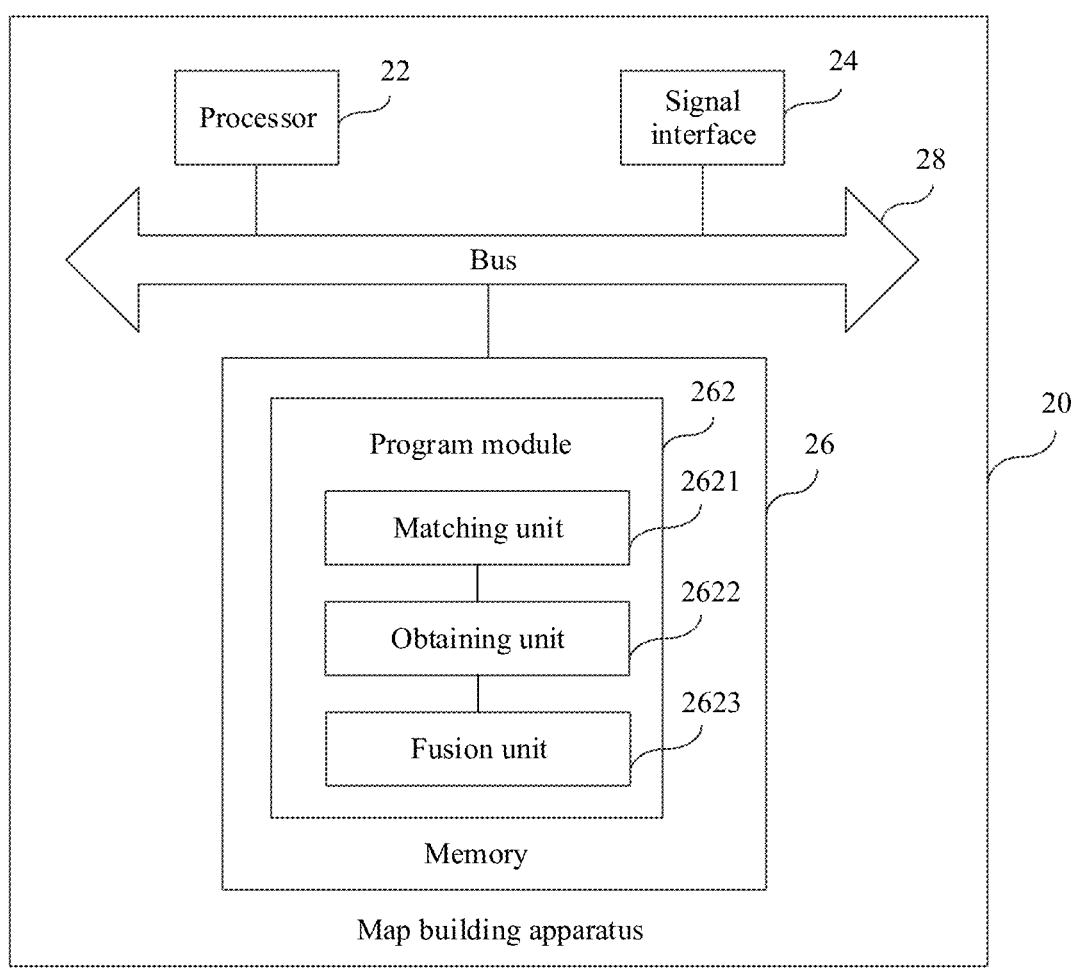
FIG. 22 is a structural block diagram of a map building apparatus according to an embodiment of this application.

Referring to FIG. 22, the map building apparatus 20 may include components such as a processor 22, a signal interface 24, a memory 26, and a bus 28. Both the memory 26 and the signal interface 24 are connected to the processor 22 through the bus 28.

The processor 22 may include one or more processing cores. The processor 22 performs various function applications and data processing by running a software program and a module. The processor 22 may include one or more of a central processing unit, a digital signal processor, a microprocessor, a microcontroller, or an artificial intelligence processor, and may further optionally include a hardware accelerator for performing an operation, for example, various logic operation circuits.

There may be a plurality of signal interfaces 24. The signal interface 24 is configured to establish a connection to another apparatus or module. For example, the signal interface 24 may be configured to connect to a transceiver. Therefore, optionally, the map building apparatus 20 may further include a transceiver (not shown in the figure). The transceiver performs signal receiving and sending. For example, the transceiver may be configured to receive, from a terminal, a map layer and a relative displacement between image capture locations. When the processor 22 needs to perform signal receiving and sending operations, the processor 22 may invoke or drive the transceiver to perform corresponding receiving and sending operations. Therefore, when the map building apparatus 20 performs signal receiving and sending, the processor 22 is configured to determine or initiate receiving and sending operations, and acts as an initiator; and the transceiver is configured to perform specific receiving and sending, and acts as a performer. The transceiver may alternatively be a transceiver circuit, a radio frequency circuit, or a radio frequency unit. This is not limited in this embodiment.

The memory 26 may be configured to store a computer program and a module. The computer program may be an application program or a drive program. For example, the memory 26 may store a program module 262 for at least one function. The program module 262 may include a matching unit 2621, an obtaining unit 2622, and a fusion unit 2623.

The matching unit 2621 has a function that is the same as or similar to that of the matching module 601. For example, the matching unit 2621 is configured to perform step 205 in the foregoing method embodiment.

The obtaining unit 2622 has a function that is the same as or similar to that of the obtaining module 602. For example, the obtaining unit 2622 is configured to perform step 206 in the foregoing method embodiment.

The fusion unit 2623 has a function that is the same as or similar to that of the fusion module 603. For example, the fusion unit 2623 is configured to perform step 207 in the foregoing method embodiment.

An embodiment of this application further provides a map building apparatus. The map building apparatus may include a processor and a memory. The memory may store a computer program. When the processor executes the computer program stored in the memory, the map building apparatus can perform the map building methods provided in the embodiments of this application. For example, the map building apparatus is configured to perform step 201 to step 204 in the foregoing method embodiment.

Figure 23:
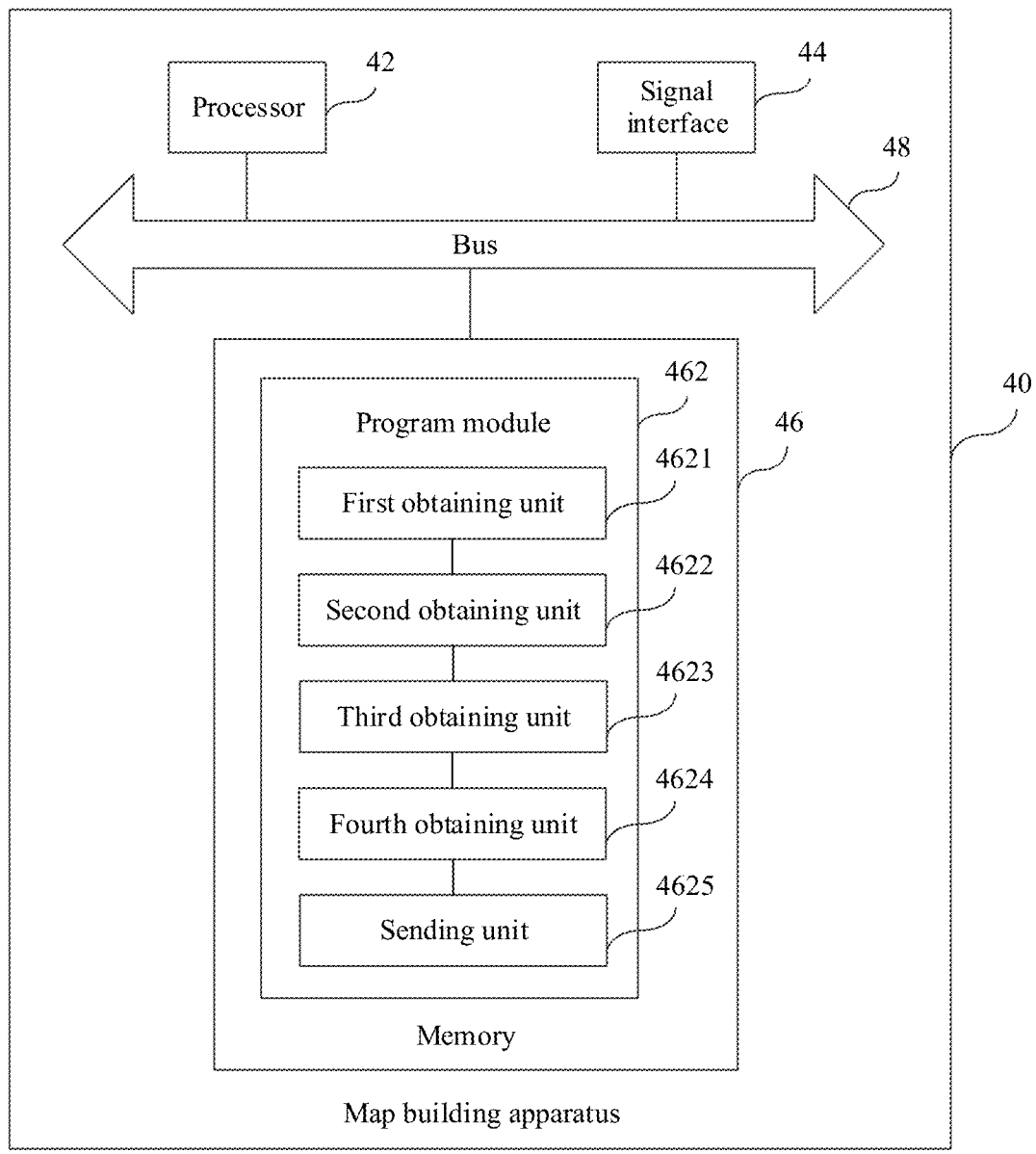
FIG. 23 is a structural block diagram of another map building apparatus according to an embodiment of this application.

Referring to FIG. 23, the map building apparatus 40 may include components such as a processor 42, a signal interface 44, a memory 46, and a bus 48. Both the memory 46 and the signal interface 44 are connected to the processor 42 through the bus 48.

The processor 42 may include one or more processing cores. The processor 42 performs various function applications and data processing by running a software program and a module. The processor 42 may include one or more of a central processing unit, a digital signal processor, a microprocessor, a microcontroller, or an artificial intelligence processor, and may further optionally include a hardware accelerator for performing an operation, for example, various logic operation circuits.

There may be a plurality of signal interfaces 44. The signal interface 44 is configured to establish a connection to another apparatus or module. For example, the signal interface 44 may be configured to connect to a transceiver. Therefore, optionally, the map building apparatus 40 may further include a transceiver (not shown in the figure). The transceiver performs signal receiving and sending. For example, the transceiver may be configured to send a map layer and a relative displacement between image capture locations to a server. When the processor 42 needs to perform signal receiving and sending operations, the processor 42 may invoke or drive the transceiver to perform corresponding receiving and sending operations. Therefore, when the map building apparatus 40 performs signal receiving and sending, the processor 42 is configured to determine or initiate receiving and sending operations, and acts as an initiator; and the transceiver is configured to perform specific receiving and sending, and acts as a performer. The transceiver may alternatively be a transceiver circuit, a radio frequency circuit, or a radio frequency unit. This is not limited in this embodiment.

The memory 46 may be configured to store a computer program and a module. The computer program may be an application program or a drive program. For example, the memory 46 may store a program module 462 for at least one function. The program module 462 may include a first obtaining unit 4621, a second obtaining unit 4622, a third obtaining unit 4623, a fourth obtaining unit 4624, and a sending unit 4625.

The first obtaining unit 4621 has a function that is the same as or similar to that of the first obtaining module 701. For example, the first obtaining unit 4621 is configured to perform step 201 in the foregoing method embodiment.

The second obtaining unit 4622 has a function that is the same as or similar to that of the second obtaining module 702. For example, the second obtaining unit 4622 is configured to perform step 202 in the foregoing method embodiment.

The third obtaining unit 4623 has a function that is the same as or similar to that of the third obtaining module 703. For example, the third obtaining unit 4623 is configured to perform step 203 in the foregoing method embodiment.

The fourth obtaining unit 4624 has a function that is the same as or similar to that of the fourth obtaining module 704. For example, the fourth obtaining unit 4624 is configured to perform step 204 in the foregoing method embodiment.

The sending unit 4625 has a function that is the same as or similar to that of the sending module 705. For example, the sending unit 4625 is configured to perform step 205 in the foregoing method embodiment.

In an implementation, the map building apparatus 40 may further include a display screen, a camera component, and the like.

The display screen is configured to display a UI (User Interface). For example, the display screen may be configured to display an image carrying image information of a target environment. The UI may include a graphic, a text, an icon, a video, and any combination thereof. When the display screen is a touch display screen, the display screen further has a capability of acquiring a touch signal on or above a surface of the display screen. The touch signal may be input to the processor as a control signal for processing. In this case, the display screen may further be configured to provide a virtual button and/or a virtual keyboard, which are/is also referred to as a soft button and/or a soft keyboard. In some embodiments, there may be one display screen disposed on a front panel of the map building apparatus. In some other embodiments, there may be at least two display screens disposed on different surfaces of the map building apparatus or designed in a folded manner. In still some other embodiments, the display screen may be a flexible display screen, and is disposed on a curved surface or a folded surface of the map building apparatus. The display screen may even be set to a non-rectangular irregular graphic, that is, an irregularly-shaped screen. The display screen may be made of a material such as an LCD (Liquid Crystal Display) or an OLED (Organic Light-Emitting Diode).

The camera component is configured to capture an image or a video. For example, the camera is configured to capture an image carrying image information of a target environment. Optionally, the camera component includes a front-facing camera and a rear-facing camera. For example, the front-facing camera is disposed on the front panel of the map building apparatus, and the rear-facing camera is disposed on a back face of the map building apparatus. In some embodiments, there are at least two rear-facing cameras, each of which is any one of a main camera, a depth-of-field camera, a wide-angle camera, and a telephoto camera, to implement a bokeh function by fusing the main camera and the depth-of-field camera, panoramic shooting and a VR (Virtual Reality) shooting function by fusing the main camera and the wide-angle camera, or another fusion shooting function. In some embodiments, the camera component may further include a flash. The flash may be a single color temperature flash or a double color temperature flash. The double color temperature flash is a combination of a warm light flash and a cold light flash, and may be configured to perform light compensation at different color temperatures.

An embodiment of this application further provides a storage medium. The storage medium may be a non-volatile computer-readable storage medium. The storage medium stores a computer program. The computer program instructs a server to perform the map building methods provided in the embodiments of this application. The foregoing storage medium includes: any medium that can store program code, such as a read-only memory (ROM), a random access memory (RAM), a magnetic disk, or an optical disc.

An embodiment of this application further provides a computer program product including an instruction. When the computer program product is run on a computer, the computer is enabled to perform the map building methods provided in the embodiments of this application. The computer program product may include one or more computer instructions. When the computer program instructions are loaded or executed on the computer, the procedure or functions according to the embodiments of this application are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A map building apparatus, comprising a processor and a memory, wherein the memory is configured to store program instructions, and the processor coupled to the memory is configured to execute the program instructions to:
    perform feature point matching on feature points at each of two map layers of a plurality of map layers useable to build a map, to obtain a plurality of feature point pairs, wherein each feature point pair of the plurality of feature point pairs comprises two feature points that are respectively from the two map layers and that match each other, each map layer comprises feature points in a plurality of frames of images, and each frame of the plurality of frames of images carries image information of a target environment, wherein the two map layers comprise a first map layer and a second map layer;
    obtain a target displacement relationship between the two map layers based on map layer space coordinates, at a corresponding map layer, of each feature point in each feature point pair of the plurality of feature point pairs, wherein the map layer space coordinates are obtained based on image coordinates of the each feature point in a target image and a relative displacement between capture locations of each of two frames of target images, the relative displacement is obtained based on a motion parameter of an image capture component at the capture locations, the motion parameter is useable to indicate a motion status of the image capture component, and the target image is an image in which the each feature point is located;
    perform map layer fusion on the each of two map layers based on the target displacement relationship between the each of two map layers, to obtain a map of the target environment;
    determine at least one first projection plane based on map layer space coordinates of all feature points that are at the first map layer and that belong to the plurality of feature point pairs;
    obtain, based on both a pixel value of any first to-be-matched feature point in a first image and a pixel value of each second to-be-matched feature point in a second image, a specified parameter corresponding to the second to-be-matched feature point, wherein the specified parameter is useable to indicate a difference between image information represented by the first to-be-matched feature point and the second to-be-matched feature point, the first image is any image in which the first to-be-matched feature point is located and that is in a first plurality of frames of images corresponding to the first map layer, and the second image is any image in which the second to-be-matched feature point is located and that is in a second plurality of frames of images corresponding to the second map layer; and
    determine, as a feature point that matches the first to-be-matched feature point, a second to-be-matched feature point corresponding to a smallest specified parameter.

2. The apparatus according to claim 1, wherein the processor is further configured to execute the program instructions to:
    determine at least one second projection plane based on map layer space coordinates of all feature points that are at the second map layer and that belong to the plurality of feature point pairs, wherein the at least one first projection plane is in a one-to-one correspondence with the at least one second projection plane, and a plurality of feature points for determining each first projection plane and a plurality of feature points for determining a corresponding second projection plane are feature points that match in a one-to-one manner;
    construct a projection error function with respect to a first graphic and a second graphic based on map layer space coordinates of feature points on projection planes that have a correspondence with each other, wherein the projection error function is useable to represent a relationship that a projection error between the first graphic and the second graphic varies with a first displacement relationship between the two map layers, the first graphic is configured to use, as vertices, all the feature points that are at the first map layer and that belong to the plurality of feature point pairs, and the second graphic is configured to use, as vertices, all the feature points that are at the second map layer and that belong to the plurality of feature point pairs; and
    determine, as the target displacement relationship, a second displacement relationship that corresponds to a minimum value of the projection error function.

3. The apparatus according to claim 2, wherein the processor is further configured to execute the program instructions to:
    for each pair of a first projection plane and a second projection plane that have a correspondence with each other, construct a projection error subfunction with respect to a first polygon and a second polygon based on map layer space coordinates of a plurality of first feature points on the first projection plane and map layer space coordinates of a plurality of second feature points on the second projection plane, wherein the projection error subfunction is useable to represent a relationship that a projection error between the first polygon and the second polygon varies with the second displacement relationship, the first polygon is a polygon with a largest area among polygons obtained by connecting the plurality of first feature points together, and having first areas, and the second polygon is a polygon with a largest area among polygons obtained by connecting the plurality of second feature points together and having second areas; and determine, as the projection error function, a sum of one or more projection error subfunctions constructed based on at least one pair of a first projection plane and a second projection plane that have a correspondence with each other.

4. The apparatus according to claim 3, wherein before the constructing the projection error subfunction with respect to the first polygon and the second polygon based on the map layer space coordinates of the plurality of first feature points on the first projection plane and the map layer space coordinates of the plurality of second feature points on the second projection plane, the processor is further configured to execute the program instructions to:

determine center-of-mass coordinates of the first polygon based on the map layer space coordinates of the plurality of first feature points; and determine center-of-mass coordinates of the second polygon based on the map layer space coordinates of the plurality of second feature points; and the construct the projection error subfunction with respect to the first polygon and the second polygon based on the map layer space coordinates of the plurality of first feature points on the first projection plane and the map layer space coordinates of the plurality of second feature points on the second projection plane comprises:

construct the projection error subfunction based on the map layer space coordinates of the plurality of first feature points, the map layer space coordinates of the plurality of second feature points, the center-of-mass coordinates of the first polygon, and the center-of-mass coordinates of the second polygon.

5. The apparatus according to claim 2, wherein the processor is further configured to execute the program instructions to:

determine, for all the feature points that are at the first map layer and that belong to the plurality of feature point pairs, an initial plane based on map layer space coordinates of any three unmarked feature points, and add the any three unmarked feature points to a first target point set corresponding to the initial plane, wherein all the feature points that are at the first map layer and that belong to the plurality of feature point pairs are initially in an unmarked state;

sequentially perform a screening procedure on all other feature points until a total quantity of feature points in the first target point set reaches a preset quantity, to thereby obtain one first target point set, and mark all feature points in the first target point set, wherein the all other feature points are all of the feature points in the unmarked feature points except the any three unmarked feature points;

repeat the processes to determine the initial plane and to sequentially perform the screening procedure until all the feature points that are at the first map layer and that belong to the plurality of feature point pairs are marked, to thereby obtain the at least one first target point set; and determine a first projection plane based on all feature points in each first target point set to obtain the at least one first projection plane, wherein for each of the all other feature points, the screening procedure comprises:

determine a plurality of polygons that use, as vertices, the feature point and all the feature points in the first target point set in response to a distance from the feature point to the initial plane being less than a preset distance threshold; and add the feature point to the first target point set to obtain an updated first target point set in response to a convex polygon being in the plurality of polygons.

6. The apparatus according to claim 2, wherein the processor is further configured to execute the program instructions to:

determine, for all feature points at the second map layer, one second target point set based on each first projection plane, wherein each second target point set comprises a plurality of feature points that match a plurality of feature points on the first projection plane in a one-to-one manner; and determine, as a second projection plane corresponding to the first projection plane, a plane on which the plurality of feature points comprised in each second target point set are located, to obtain the at least one second projection plane.

7. The apparatus according to claim 1, wherein the processor is further configured to execute the program instructions to:

obtain, based on a pixel value of any first to-be-matched feature point in a first image and a pixel value of any second to-be-matched feature point in a second image, a specified parameter corresponding to the second to-be-matched feature point, wherein the specified parameter is useable to indicate a difference between image information represented by the first to-be-matched feature point and the second to-be-matched feature point, the first image is any image in which the first to-be-matched feature point is located and that is in a first plurality of frames of images corresponding to the first map layer, and the second image is any image in which the second to-be-matched feature point is located and that is in a second plurality of frames of images corresponding to the second map layer; and determine that the first to-be-matched feature point matches the second to-be-matched feature point in response to the specified parameter being less than a first preset threshold.

8. The apparatus of claim 1, wherein each of the first image and the second image are represented by an image pyramid comprising a plurality of levels of sub-images, and a plurality of levels of sub-images of the first image are in a one-to-one correspondence with a plurality of levels of sub-images of the second image, and the processor is further configured to execute the program instructions to:

obtain, based on each level of sub-image of the first image and corresponding level of sub-image of the second image, a specified parameter component of the corresponding level; and determine, as the specified parameter, a sum of specified parameter components corresponding to the plurality of levels of sub-images.

9. The apparatus according to claim 8, wherein the specified parameter includes at least a pixel grayscale difference or a descriptor similarity.

10. The apparatus according to claim 7, wherein both of the first image and the second image are represented by an image pyramid comprising a plurality of levels of sub-images, and a plurality of levels of sub-images of the first image are in a one-to-one correspondence with a plurality of levels of sub-images of the second image, and the processor is further configured to execute the program instructions to:
   obtain, based on each level of sub-image of the first image and the corresponding level of sub-image of the second image, a specified parameter component of the corresponding level; and
   determine, as the specified parameter, a sum of specified parameter components corresponding to the plurality of levels of sub-images.

11. The apparatus according to claim 10, wherein the specified parameter includes at least a pixel grayscale difference or a descriptor similarity.

12. The apparatus according to claim 4, wherein the second displacement relationship includes a rotation relationship and a translation relationship; and map layer space coordinates $S_{ri}$ of the first feature point, map layer space coordinates $S_{li}$ of the second feature point, center-of-mass coordinates Xr of the first polygon, center-of-mass coordinates Xl of the second polygon, a projection error subfunction E, a rotation relationship R, and a translation relationship T satisfy the following:

$$E = \sum_{i=0}^{n} [\|S_{ri} - [R \cdot S_{li} + T]\|^2 + \|Xr - [R \cdot X1 + T]\|^2],$$

wherein n is a total quantity of the first feature points on the first projection plane, and $\|\cdot\|$ is a norm operation.

13. The apparatus according to claim 1, wherein the processor is further configured to execute the program instructions to:
   for at least one of the two map layers, perform coordinate transformation on the map layer space coordinates of all feature points at the corresponding map layer, so that the map layer space coordinates of all feature points on the map that includes feature points at the plurality of map layers are obtained based on a same reference coordinate system.

14. A system comprising: a map building apparatus, the map building apparatus comprising a processor and a memory, wherein the memory is configured to store program instructions, and the processor coupled to the memory is configured to execute the program instructions to:
   obtain a plurality of frames of images that carry image information of a target environment, wherein the plurality of frames of images are captured by an image capture component;
   obtain a motion parameter of the image capture component at a capture location of each frame of the plurality of frames of images, wherein the motion parameter is useable to indicate a motion status of the image capture component;
   obtain a relative displacement between capture locations of each of two frames of images based on the motion parameter of the image capture component;
   obtain, based on the plurality of frames of images and the relative displacement, a map layer comprising feature points in the plurality of frames of images, wherein the map layer is useable to build a map;
   send the map layer and the relative displacement to a server;
   perform feature point matching on feature points at each of two map layers of a plurality of map layers useable to build the map, to obtain a plurality of feature point pairs, wherein each feature point pair of the plurality of feature point pairs comprises two feature points that are respectively from the two map layers and that match each other, each map layer comprises feature points in the plurality of frames of images, and each frame of the plurality of frames of images carries the image information of the target environment, wherein the two map layers comprise a first map layer and a second map layer;
   obtain a target displacement relationship between the two map layers based on map layer space coordinates, at a corresponding map layer, of each feature point in each feature point pair of the plurality of feature point pairs, wherein the map layer space coordinates are obtained based on image coordinates of the each feature point in a target image and the relative displacement between capture locations of each of two frames of target images, the relative displacement is obtained based on the motion parameter of the image capture component at the capture locations, the motion parameter is useable to indicate the motion status of the image capture component, and the target image is an image in which the each feature point is located;
   perform map layer fusion on the each of two map layers based on the target displacement relationship between the each of two map layers, to obtain a map of the target environment;
   determine at least one first projection plane based on map layer space coordinates of all feature points that are at the first map layer and that belong to the plurality of feature point pairs;
   obtain, based on both a pixel value of any first to-be-matched feature point in a first image and a pixel value of each second to-be-matched feature point in a second image, a specified parameter corresponding to the second to-be-matched feature point, wherein the specified parameter is useable to indicate a difference between image information represented by the first to-be-matched feature point and the second to-be-matched feature point, the first image is any image in which the first to-be-matched feature point is located and that is in a first plurality of frames of images corresponding to the first map layer, and the second image is any image in which the second to-be-matched feature point is located and that is in a second plurality of frames of images corresponding to the second map layer; and
   determine, as a feature point that matches the first to-be-matched feature point, a second to-be-matched feature point corresponding to a smallest specified parameter.

15. The system according to claim 14, wherein the plurality of frames of images are all key-frame images that carry the image information of the target environment, and the processor is further configured to execute the program instructions to:
   obtain a plurality of frames of to-be-screened images that carry the image information of the target environment;
   obtain a target parameter of each frame of to-be-screened image of the plurality of frames of to-be-screened images, wherein the target parameter is useable to indicate a variation of the to-be-screened image relative to a specified image; and determine the to-be-screened image as a key-frame image in response to the target parameter of the to-be-screened image being greater than a first preset threshold.

16. The system according to claim 15, wherein the target parameter includes one or more of the following:
   a time interval between a capture time point of the to-be-screened image and a capture time point of the specified image;
   an angle variation between an angle of view of the image capture component during capture of the to-be-screened image and an angle of view of the image capture component during capture of the specified image;
   a relative displacement between a capture location of the to-be-screened image and a capture location of the specified image;
   a first total quantity of feature points included in the to-be-screened image; or
   a first ratio of a second total quantity to the first total quantity, wherein the second total quantity is a total quantity of feature points included in the to-be-screened image, and are different from feature points included in the specified image.

17. The system according to claim 14, wherein the plurality of frames of images are adjacent in time, and a specified image corresponding to each frame of to-be-screened image is a frame of a key-frame image that is in the plurality of frames of images, and is prior to and closest to the to-be-screened image in time.

18. The system according to claim 16, wherein in response to the target parameter of the to-be-screened image being greater than the first preset threshold, the processor is further configured to execute the program instructions to:
   determine a second ratio of the second total quantity to a third total quantity in response to the target parameter of the to-be-screened image being greater than the first preset threshold, wherein the third total quantity is a total quantity of feature points included in the to-be-screened image; and
   determine the to-be-screened image as the key-frame image in response to the second ratio being greater than a preset ratio.

19. A non-transitory computer readable medium comprising computer executable instructions stored thereon, wherein in response to the instructions being executed by a processor, causes the processor to perform the following steps:
   obtaining a plurality of frames of images that carry image information of a target environment, wherein the plurality of frames of images are captured by an image capture component;
   obtaining a motion parameter of the image capture component at a capture location of each frame of the plurality of frames of images, wherein the motion parameter is useable to indicate a motion status of the image capture component;
   obtaining a relative displacement between capture locations of each of two frames of images based on the motion parameter of the image capture component;
   obtaining, based on the plurality of frames of images and the relative displacement, a map layer comprising feature points in the plurality of frames of images, wherein the map layer is useable to build a map;
   sending the map layer and the relative displacement to a server;
   performing feature point matching on feature points at each of two map layers of a plurality of map layers useable to build the map, to obtain a plurality of feature point pairs, wherein each feature point pair of the plurality of feature point pairs comprises two feature points that are respectively from the two map layers and that match each other, each map layer comprises feature points in the plurality of frames of images, and each frame of the plurality of frames of images carries the image information of the target environment, wherein the two map layers comprise a first map layer and a second map layer;
   obtaining a target displacement relationship between the two map layers based on map layer space coordinates, at a corresponding map layer, of each feature point in each feature point pair of the plurality of feature point pairs, wherein the map layer space coordinates are obtained based on image coordinates of the each feature point in a target image and the relative displacement between capture locations of each of two frames of target images, the relative displacement is obtained based on the motion parameter of the image capture component at the capture locations, the motion parameter is useable to indicate the motion status of the image capture component, and the target image is an image in which the each feature point is located;
   performing map layer fusion on the each of two map layers based on the target displacement relationship between the each of two map layers, to obtain a map of the target environment;
   determining at least one first projection plane based on map layer space coordinates of all feature points that are at the first map layer and that belong to the plurality of feature point pairs;
   obtaining, based on both a pixel value of any first to-be-matched feature point in a first image and a pixel value of each second to-be-matched feature point in a second image, a specified parameter corresponding to the second to-be-matched feature point, wherein the specified parameter is useable to indicate a difference between image information represented by the first to-be-matched feature point and the second to-be-matched feature point, the first image is any image in which the first to-be-matched feature point is located and that is in a first plurality of frames of images corresponding to the first map layer, and the second image is any image in which the second to-be-matched feature point is located and that is in a second plurality of frames of images corresponding to the second map layer; and
   determining, as a feature point that matches the first to-be-matched feature point, a second to-be-matched feature point corresponding to a smallest specified parameter.

* * * * *

UNITED STATES PATENT AND TRADEMARK OFFICE
CERTIFICATE OF CORRECTION

PATENT NO. : 12,266,177 B2
APPLICATION NO. : 17/333811
DATED : April 1, 2025
INVENTOR(S) : Li et al.

It is certified that error appears in the above-identified patent and that said Letters Patent is hereby corrected as shown below:

In the Claims

Claim 8: Column 48, Line 54: "The apparatus of claim 1, wherein each of the first" should read as -- The apparatus according to claim 1, wherein each of the first --.

Signed and Sealed this
Fifteenth Day of July, 2025

Coke Morgan Stewart
*Acting Director of the United States Patent and Trademark Office*